US012242528B2

(12) United States Patent
Yim

(10) Patent No.: US 12,242,528 B2
(45) Date of Patent: Mar. 4, 2025

(54) ACTIONABLE SUGGESTIONS FOR MEDIA CONTENT

(71) Applicant: GOOGLE LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 21 days.

(21) Appl. No.: 17/946,806

(22) Filed: Sep. 16, 2022

(65) Prior Publication Data
US 2024/0095273 A1 Mar. 21, 2024

(51) Int. Cl.
G06F 16/40 (2019.01)
G06F 16/435 (2019.01)
G06F 16/45 (2019.01)

(52) U.S. Cl.
CPC ............ *G06F 16/45* (2019.01); *G06F 16/435* (2019.01)

(58) Field of Classification Search
CPC ................................ G06F 16/45; G06F 16/435
See application file for complete search history.

(56) References Cited

U.S. PATENT DOCUMENTS

| 8,255,948 | B1 * | 8/2012 | Black | H04N 21/812 |
| | | | | 725/35 |
| 2010/0130527 | A1 * | 5/2010 | Lehrer | G16B 25/00 |
| | | | | 435/6.16 |
| 2010/0131527 | A1 * | 5/2010 | Wohlert | G06F 16/435 |
| | | | | 707/E17.112 |
| 2015/0279360 | A1 * | 10/2015 | Mengibar | G06F 40/205 |
| | | | | 704/257 |
| 2015/0382047 | A1 | 12/2015 | Van Os et al. | |
| 2016/0028788 | A1 * | 1/2016 | Panguluri | H04L 67/01 |
| | | | | 709/203 |
| 2016/0246792 | A1 * | 8/2016 | Anguiano | G06F 16/9537 |
| 2016/0358597 | A1 * | 12/2016 | Panguluri | G06Q 10/10 |
| 2016/0360261 | A1 * | 12/2016 | Makhlouf | G06F 3/04817 |
| 2017/0150231 | A1 * | 5/2017 | Brulotte | H04N 21/454 |
| 2017/0195733 | A1 * | 7/2017 | de Mello Maia | H04N 21/4826 |
| 2017/0214980 | A1 * | 7/2017 | Nadler | H04N 21/2543 |

(Continued)

FOREIGN PATENT DOCUMENTS

EP 4018353 A1 * 6/2022
WO WO2021030915 A1 * 2/2021

*Primary Examiner* — Daniel A Kuddus
(74) *Attorney, Agent, or Firm* — Gray Ice Higdon

(57) ABSTRACT

Implementations relate to processing media content, and/or associated metadata, to classify the media content into a first category, of a plurality of predefined categories. Versions of those implementations further relate to extracting target content from the media content; generating, based on the extracted target content, an action that corresponds to an application; and generating, based on the generated action, a selectable suggestion including a textual portion that describes the action. Some of those versions further relate to causing the selectable suggestion to be displayed at a display of a client device, along with rendering of the media content. The selectable suggestion, when selected, causes the application to perform the action. The target content can be extracted based on the first category and can be extracted based on the first category in response to the media content being classified into the first category.

20 Claims, 18 Drawing Sheets

(56) References Cited

U.S. PATENT DOCUMENTS

2019/0171765 A1* 6/2019 Gopalan ............. G06F 16/9535
2020/0401639 A1* 12/2020 Kussmaul ........... G06F 16/9535
2020/0410639 A1* 12/2020 Aoyama ............. H04N 25/133
2022/0004572 A1* 1/2022 Panguluri ........... G06F 16/4387
2022/0253165 A1* 8/2022 Beaumier ................. G07F 7/04

* cited by examiner

ACTIONABLE SUGGESTIONS FOR MEDIA CONTENT

BACKGROUND

People nowadays frequently access media content (e.g., videos, music, slides with audio, vlogs), that is published or shared at websites, apps, or content-sharing platforms, to learn, to entertain, or to acquaint with information. While browsing such media content, users may want to access a third-party application (e.g., a note-taking app), to perform one or more actions relating to the media content, using information extracted from (or associated with) the media content. For example, when watching a cooking video via a social media platform, a user may want to save a recipe provided by the cooking video in a note-taking app for future use. Using existing technologies, the user will have to first open the note-taking app and manually write down the recipe (if the recipe is not provided in a textual or image format), save a screenshot of the recipe (if the recipe is displayed in, or as an image along with, the cooking video), or copy and paste (if the recipe is displayed in textual format). This means the user will need to leave the cooking video (e.g., manually pause/close it or have a portion of the video unattended) to save the recipe information in the note-taking app.

Continuing with this scenario, the user may want to try out the recipe by ordering items listed as ingredients for the recipe. In this case, the user will have to open a grocery app (or access a website), and manually search for and add the ingredients to a shopping cart of the grocery app. From confirming each ingredient mentioned in the cooking video to searching for the ingredients one after one using the grocery app, it can be a time-consuming process that not only requires the user to input a lot of time and effort but also occupies intensive computing resources of a client device the user uses to watch the cooking video and perform grocery shopping. To help users in the above and other similarly applicable situations, there is a need for assisting the users in performing one or more desired actions without leaving the media content they are currently browsing, to avoid activating additional widgets or applications that may require extended subsequent operations like manual input or searches.

SUMMARY

Some implementations disclosed herein relate to generating and displaying an actionable suggestion for media content such as a video or audio, where the actionable suggestion can include a textual portion that describes an action (e.g., add to cart, learn more about this brand) to be performed via an third-party application (e.g., a note-taking application) or a first party application (e.g., an automated assistant). The media content can be displayed via a content-access application (sometimes referred to as "content-sharing application") at a client computing device (sometimes referred to as "client device"). Before or while being displayed, the media content can be received directly (or instead, an address of the media content can be received) by a server computing device and/or the client computing device, to generate the actionable suggestion. For example, the server computing device can parse the address of the media content to retrieve the media content and/or the metadata associated with the media content, for further processing (e.g., generating actionable suggestions).

In some implementations, media content can be received with a classification label. In other implementations, the media content can be received without a classification label. When the media content is received without a classification label, the media content and/or metadata associated with the media content, can be processed to generate a classification label (e.g., music or recipe label), and the generated classification label can be assigned to the media content so that the media content is classified into a corresponding category (e.g., recipe or recipe-recommendation category), of one or more predefined categories (e.g., a recipe category, a music-mix category, a movie category, a trip category, a test-preparation category, a shopping haul category, an experience-sharing category, a story category, a biography category, a room-tour category, a dog-training category, a concert category, etc.). Optionally, each of the one or more predefined categories can correspond to a predefined classification label, or alternatively correspond to one or more predefined classification labels. For example, a predefined "music" category can correspond to a predefined "music" classification label, or the predefined "music" category can correspond to a predefined "music-singer" classification label as well as an additional predefined "music-song" classification label. In the latter case, content extraction parameter(s) for the predefined "music-singer" classification label can be singer extraction parameter(s), and thus are different from content extraction parameter(s) for the predefined "music-song" classification label, which can be song extraction parameter(s). More descriptions for content extraction parameter(s) can be found elsewhere in this disclosure.

As a non-limiting example, the one or more predefined categories can be three predefined categories that include: a travel-recommendation category, a music-recommendation category, and a recipe-recommendation category. In this example, given a received video as the media content, the received video and/or metadata of the video (e.g., a title or short description of the received video) can be processed to determine whether the received video should be classified as belonging to the travel-recommendation category, belonging to the music-recommendation category, belonging to the recipe-recommendation category, or not belonging to any of the three categories. In situations where the processing indicates that the video does not belong to any of these predefined categories, no classification label is correspondingly generated and assigned to the video, or the video can optionally be classified into a "null" category and/or be assigned a "null" classification label, as described below.

Continuing with the above example, assume that processing of a received video and/or metadata of the received video indicates that the received video should be classified into the travel-recommendation category exclusively. For instance, the processing can include generating, based on the received video and/or the metadata, a corresponding probability for each of the predefined categories. The processing can indicate classification into the travel-recommendation category exclusively based on the corresponding probability, for the travel-recommendation category, satisfying a threshold while all other corresponding probabilities fail to satisfy the threshold. In this case, a travel-recommendation label that corresponds to the travel-recommendation category can be assigned to the received video. As another example, assume that processing of a received video and/or metadata of the received video indicates that the received video should not be classified into any of the predefined categories. For instance, the processing can include generating, based on the received video and/or the metadata, a corresponding probability for each of the predefined categories. The processing can indicate that the video should not be classified into any category based on the corresponding probabilities all failing to satisfy the threshold. In this case, no classification label will be assigned to the video or a "null" classification label can be assigned to the video. As described herein, when a video has a "null" classification label or lacks assignment of any of the predefined classification labels, certain further processing of the video can be bypassed. For example, target content extraction from the video can be bypassed, even when the video includes content that conforms to content extraction parameter(s) for one of the predefined classification labels. For instance, content extraction parameter(s) for a recipe classification label can cause extraction of food and quantity pairs from video transcriptions (and/or video frames). Despite the transcription of the video including "6 eggs and 1 gallon of milk" (e.g., the video may be a math lesson video that happens to use "6 eggs and 1 gallon of milk" as part of an example math problem), extraction of "6 eggs and 1 gallon of milk" will be bypassed due to the video including a "null" classification label or lacking any of the predefined classification labels. In these and other manners, various computational efficiencies can be achieved by only performing target content extraction, that is specific to a predefined category (or a predefined classification label), on a video when the video is determined to have the predefined category. For example, computational resources involved in target content extraction can be conserved, as well as computational resources involved in rendering actionable suggestion(s) for extracted content and/or involved in performing action(s) corresponding to selected actionable suggestions.

In some implementations, media content can be classified into more than one category, of the one or more predefined categories. Continuing with the above example, in a situation where the one or more predefined categories are predefined to include three predefined categories (e.g., the travel category, the music category, and the recipe category), a video that includes a recommended recipe and a recommended song to enjoy when preparing the recipe can be classified into both the music-recommendation category and the recipe-recommendation category. In this case, the received video may be assigned a first classification label (e.g., a music-recommendation label) and a second classification label (e.g., a recipe-recommendation label). Subsequently, a first type of target content (e.g., a name of the recommended song, lyrics or an audio piece of the recommended song, and/or a singer of the recommended song) can be extracted from the received video based on the first classification label, and a second type of target content (e.g., ingredients for the recipe and/or cooking instructions) can be extracted from the received video based on the second classification label.

In some implementations, the media content includes a plurality of video frames or image frames. In this case, processing the media content to generate a classification label for the media content can include: processing the plurality of video frames (or image frames). For instance, processing the plurality of video frames (or image frames) can include: detecting one or more graphical (e.g., image) objects from the plurality of video frames or image frames, determining one or more target objects from the one or more detected graphical objects, and generating the classification label for the media content based on the one or more determined target objects. Optionally, determining the one or more target objects can include: determining a frequency and/or duration of the one or more graphical objects that occur in the plurality of video frames (or image frames), and determining the graphical object(s) having a frequency (or duration) satisfying a first threshold as the target object(s). Optionally or additionally, processing the plurality of video frames (or image frames) can include: detecting one or more keywords displayed on the plurality of video frames (or image frames), and/or determining whether a frequency and/or duration of the one or more keywords being displayed on the plurality of video frames (or image frames) satisfies the first threshold (or a different threshold).

In some other implementations, the media content includes an audio portion, and processing the media content to generate a corresponding classification label can include: generating a transcription of the audio portion, detecting one or more keywords (e.g., 1 teaspoon Bourbon) from the transcription of the audio portion, and classifying the media content based on the one or more detected keywords. Optionally, the one or more keywords can be one or more terms from the transcription of the audio portion having a detected frequency satisfying a second threshold, where the second threshold can be different from (or the same as) the first threshold. Alternatively or additionally, the one or more keywords can be determined based at least on certain sentence structures (e.g., a term such as "dumplings", which is mentioned immediately after "how to cook", "cook", "prepare", etc.). Alternatively or additionally, the one or more keywords can be determined based at least on considering metadata (e.g., a title of the video, "how to cook dumplings") associated with the media content.

In some implementations, the media content can include both video (or image) frames and an audio portion, and a classification label can be generated for such media content by processing the video (or image) frames, and/or the transcription obtained from the audio portion. Optionally, the transcription can be obtained and processed to classify the media content prior to processing the video (or image) frames. For example, a machine learning (ML) model can be used to process the transcription obtained by recognizing the audio portion of the media content, and to output a classification label and a confidence measure. If the confidence measure exceeds a predefined threshold value, processing the video (or image) frames can be omitted, and the classification label output by the ML model can be applied as the classification label for the media content.

Alternatively or additionally, the classification label can be generated using metadata (e.g., title of the media, brief description/introduction of the media content, a wiki page or a link to the wiki page for the artist mentioned in the media content) associated with the media content. Given a video shared via a social media application as an example of the aforementioned media content, metadata associated with the media content (i.e., the shared video) can include but is not limited to: a title of the media content, a manual label of the media content, a manual description of the media content, one or more manual captions of the media content, and/or comment to the media content retrieved from a content-sharing application that is displaying the media content at the display.

When the media content is received with the classification label (e.g., the metadata associated with the media content includes the classification label), the media content may or may not need to be processed to classify the media content into a corresponding predefined category (or be assigned a predefined classification label). In some embodiments, the classification label received from the metadata associated with the media content can be compared with the one or more predefined categories (or one or more predefined classification labels), and if the received classification label matches one of the predefined categories, the received classification label can be assigned to the media content. In this case, the step of processing the media content to classify the media content into a corresponding category (or to generate a classification label) can be skipped or bypassed. If the received classification label does not match any of the predefined categories, the media content can, however, be processed, to classify the media content.

Optionally, when the received classification label does match one of the predefined categories, but there is a need to improve the accuracy that an appropriate classification label is assigned to the media content (or the accuracy that the media content is classified into an appropriate category), the media content can still be processed to determine whether the media content belongs to any of the one or more predefined categories. For example, the media content can be processed and determined to belong to a corresponding predefined category, where the corresponding predefined category matches the received classification label. In this case, the received classification label can be considered as being accurate. If the received classification label does not match the corresponding predefined category, the received classification label can be considered as being inaccurate (and/or can be discarded, or removed from the metadata associated with the media content), and a new classification label can be generated and/or assigned based on the corresponding predefined category, to replace the received classification label.

In some implementations, target content can be extracted from the media content. In some implementations, the target content can be extracted based on the classification label assigned to the media content. As a non-limiting example, for a video classified into a recipe category (which can be one of the predefined categories), ingredients (in their textual or graphic/image representations) of the recipe introduced in the video can be extracted as the target content. The ingredients can be extracted as the target content based on ingredient extraction parameters being assigned to the recipe category, and the video being classified into the recipe category.

As another non-limiting example, assume a first video and a second video, where the first video introduces a hotel (e.g., in downtown Louisville) featuring a fine dining option (e.g., a premier steakhouse at the hotel) and the second video is of the celebrity chef, of the premier steakhouse at the hotel, demonstrating how to prepare a dish served at the steakhouse. In this example, both the first and second videos can include some of the same information. For example, the first and second videos can both include a name of the hotel, an address of the hotel, and/or an image showing the look of the hotel building, a name/image of the chef, etc. However, the first and second videos also include differing content and/or differing metadata, resulting in the first video being classified into a first predefined category (e.g., hotel-recommendation) exclusively, and the second video may be classified into a different second predefined category (e.g., recipe) exclusively.

In the above non-limiting example, for the first video, the name of the hotel can be extracted from the first video as the target content (of the first video), based on the first video being classified into the hotel-recommendation category. For example, the hotel-recommendation category can be associated with content extraction parameter(s) that cause the hotel name to be extracted. In contrast, ingredients for the dish (served at the steakhouse) can be extracted from the second video as the target content, based on the second video being classified into the recipe category. For example, the recipe category can be associated with content extraction parameter(s) to be extracted. Notably, even though the second video also includes the name of the hotel, the name of the hotel will not be extracted from the second video as content extraction parameter(s), assigned to the recipe category, will not cause the name of the hotel to be extracted. Put another way, the content extraction parameter(s) assigned to the recipe category differ from those assigned to the hotel-recommendation category and lack the content extraction parameter(s), of the hotel-recommendation category, that cause the hotel name to be extracted. Continuing with the example, after the first and/or second videos are classified and content extractions performed, an action of booking a stay at the hotel can be recommended for the first video and displayed as an actionable suggestion to a user browsing the first video, and/or an action of adding ingredients to a note-keeping application can be recommended for the second video and be displayed as an actable suggestion to a user browsing the second video. In these and other manners, the content extraction performed on given media content can be dependent on the classification(s) of the media content. Accordingly, extraction of given content (and generation of related action(s) and rendering of corresponding actionable suggestion(s)) from media content can occur only when it is first determined that classification(s) of the media content are associated with content extraction parameter(s) that cause the given content to be extracted. Thus, despite the given content occurring in particular media content, the given content may not be extracted from the given media content based on determined classification(s) of the given media content. Moreover, for media content having only certain classification(s) and/or lacking any other certain classification(s), extraction of given content (and corresponding utilization thereof) can be bypassed altogether. For instance, extraction of given content from a video can be bypassed altogether when the video is not determined to have any of a plurality of predefined classifications.

In some implementations, an action, to which one or more applications correspond, can be determined based on the extracted target content, and a first application can be selected from the one or more applications to perform the action. For example, given a recipe video, a list of ingredients can be extracted as the target content based on the recipe video being classified into a predefined category (here, a "recipe" category). In this example, based on the extracted target content being the list of ingredients, the action can be copying and pasting the list of ingredients to an electronic note created using either a first third-party application (e.g., an online note-taking application) or a second third-party application (e.g., a local note-taking application). Based on the local note-taking application being used more frequently at a corresponding client device than the online note-taking application, the local note-taking application can be selected to perform the action (i.e., saving the list of ingredients in an electronic note of the local note-taking application).

In some implementations, more than one action can be determined based on the extracted target content. The more than one action can be determined based on a single classification label (or a single predefined category), and optionally, an action, of the more than one action, can be selected and performed. For example, in addition to the action of copying and pasting the list of ingredients to an electronic note via a local note-taking application (the only note-taking application that a user have access to), an additional action of adding the list of ingredients to an electronic shopping cart of a grocery application can be determined. Optionally, in this example, the grocery application may be selected to perform the action of adding the list of ingredients to its electronic shopping cart, without having the list of ingredients saved in an electronic note of the local note-taking application, based on historical user data (which indicates that the user currently browsing the media content more frequently add ingredients to a shopping cart than saving the ingredients in an electronic note when viewing similar media content, i.e., videos classified with a recipe label).

Optionally, the more than one action can be determined based on a single classification label (or a single predefined category), and the more than one action can be performed without selection. For example, when the historical user data indicates that the frequencies of the user currently browsing the media content to use the local note-taking application to save the names of the ingredients and to add the ingredients to the shopping cart both satisfy a certain frequency threshold, a first action of saving the list of ingredients in an electronic note of the local note-taking application can be recommended and performed, as well as a second action of adding the list of ingredients to an electronic shopping cart of the grocery application.

Optionally, the more than one action can be determined based on a plurality of classification labels (or a plurality of predefined categories that the media content falls within). For instance, in the example where the received video is assigned a first classification label (i.e., a music-recommendation label) and a second classification label (i.e., a recipe-recommendation label), a first type of target content (e.g., a name of the recommended song) is extracted from the received video based on the first classification label and a second type of target content (e.g., ingredients for the recipe) is extracted from the received video based on the second classification label. In this example, based on the extracted target content (i.e., the first and second types of target content), a first action (e.g., add the recommended song to a playlist of a music app) can be determined for the first type of target content, and a second action (e.g., add the ingredients to a shopping cart of a grocery app) can be determined for the second type of target content.

In some implementations, based on the determined action and the selected first third-party application, a suggestion can be generated, where the suggestion includes a textual portion that describes the action. The textual portion describing the action can be displayed at a display of the client computing device, along with the media content. As a non-limiting example, given the determined action being "adding milk and egg to a shopping cart" and the selected first third-party application being "grocery app A", the suggestion can include a textual portion, e.g, "add milk and egg to shopping cart of grocery app A", displayed along with the media content for which the suggestion is generated.

In some implementations, the suggestion is displayed at the display when a predetermined period of time (e.g., 15 seconds) has passed since the media content is displayed. Here, as a non-limiting example, the predetermined period of time can be determined from statistical user data indicating a successful attraction of users' attention.

Alternatively, in some other implementations, the suggestion is displayed at the display when the target content of the media content is rendered audibly or visually. As a non-limiting example, a video (i.e., the aforementioned media content) may introduce a building block set specifically picked for preschool children and include a video section showing how to use the building block set in different ways, and the video may have been classified into a predefined category (e.g., toy category), of one or more predefined categories (e.g., toy category, snack category, book category, clothing) or the video may have been assigned a toy classification label ("toy" label).

In the above example, the name of the building block set can be extracted from a video frame of the video as the target content (based on the video being assigned a "toy" label), and an action of adding the building block set to a shopping cart of a third-party application M can be determined based on the extracted content. Here, a suggestion can be generated based on the determined action (i.e., purchase the building block set) and a corresponding third-party application (i.e., third-party application M that have the building block set for sale), as being "add block-set-ONE to shopping cart of application M", where "block-set-ONE" represents the name of the building block set. In this example, the suggestion (i.e., "add block-set-ONE to shopping cart of application M") can be rendered to a user of the display when the video frame containing the name of the building block set is rendered at the same display to the user.

In some implementations, the suggestion is displayed for a predefined period of time (e.g., ten seconds or other predefined period), and will automatically disappear after being displayed for the predefined period of time.

In some implementations, the suggestion is displayed in a selectable element, and is embedded with a link to execute the action. Optionally, the embedded link can be a URL that identifies the action and a name of the selected first third-party application to which the action corresponds. In various implementations, when the selectable element that displays the suggestion (or the textual portion of the suggestion) is selected, the link is executed to cause the action to be performed. The action here (e.g., adding a plurality of food items into a shopping cart of "ShoppingApp") can be performed by the selected first third-party application (i.e., the "ShoppingApp"), or can be performed by an automated assistant that is installed at the client computing device and that is in communication with the selected first third-party application (i.e., the "ShoppingApp").

When the action is performed by the selected first third-party application, the link (e.g., URL) can contain a name of the selected first third-party application and a description of the action that contains a plurality of parameters for the action, where the plurality of parameters can be determined at least based on the extracted target content. When the action is performed by the automated assistant in communication with the selected first third-party application, the link (e.g., URL) can contain a name of the automated assistant, a name of the selected first third-party application, and a description of the action that includes the plurality of parameters for the action. Optionally, after the link is executed so that the action is under performance, the media content (e.g., a video) is still displayed, without any pausing of the media content, at the display of the client computing device.

In some implementations, selecting the first third-party application from the one or more third-party applications includes: generating ranking scores for the one or more third-party applications respectively, ranking, based on the generated ranking scores, the one or more third-party applications, and selecting the first third-party application based on the first third-party application has a ranking score satisfying a threshold. In some implementations, the ranking scores are generated based on user historical data, based on whether a user of the client device that browses the media content via the display of the client device has a registered account for each of the one or more third-party applications, and/or based on whether the action matches a function of each of the one or more third-party applications.

In some implementations, after a user selects the suggestion rendered at the display (i.e., the link is executed), the action is performed, and an additional suggestion can be rendered, along with the media content, at the display to replace the suggestion. The additional suggestion can be generated by the server computing device (and/or the client computing device) to include: a textual portion that suggests an additional action to be performed via the selected first third-party application. For example, after a user clicks a suggestion to perform the action of adding food items extracted from a video to a shopping cart of "ShoppingApp", an additional suggestion to perform an additional action of checking out the shopping cart via "ShoppingApp" can be rendered to the user while the video is being displayed. The user can select the additional suggestion, which can be embedded with an additional link, when executed, causes a window of the "ShoppingApp" (app version or web version) to be displayed as a new user interface of the client computing device or popped up as an overlay with respect to the video, for the user to complete the additional check-out action.

In some implementations, more than one action can be determined, and correspondingly, more than one suggestion can be generated and displayed at the display. For example, a method here can include: extracting target content from media content; and determining, based at least on the extracted target content, a plurality of actions to which one or more candidate applications respectively correspond. The method can further include: filtering one or more actions from the plurality of actions; generating, based on the filtered one or more actions and corresponding one or more candidate application, one or more suggestions, where the filtered one or more actions includes a first action relating to a function of a first candidate application, and wherein the first action is performed via an automated assistant in communication with the first candidate application. In this example, the one or more generated suggestions can be displayed at the display of the client computing device, along with the media content.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain embodiments of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1:
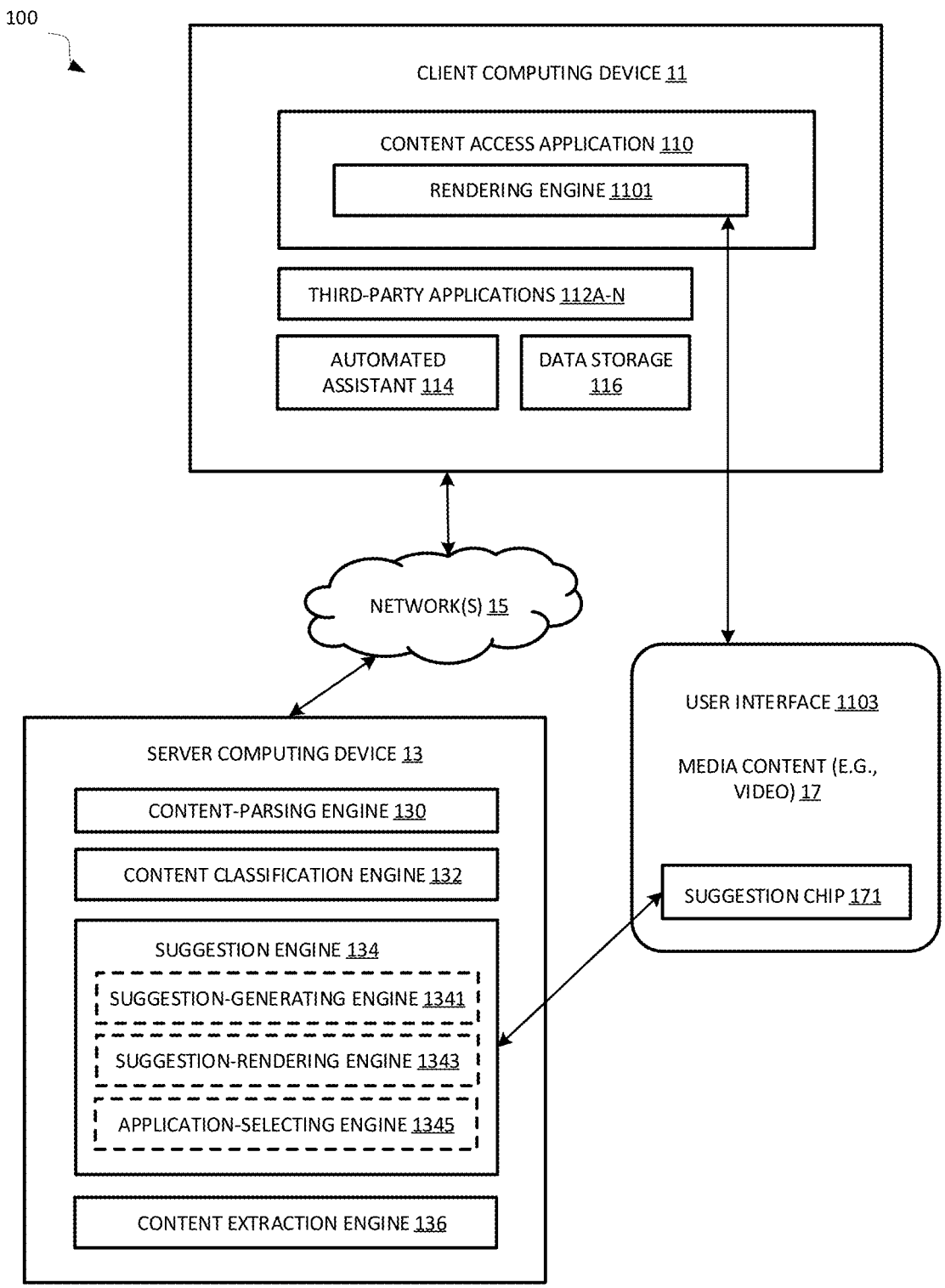
FIG. 1 depicts a block diagram of an example environment that demonstrates various aspects of the present disclosure, and in which implementations disclosed herein may be implemented.

FIG. 1 is a block diagram of an example environment that demonstrates various aspects of the present disclosure, and in which implementations disclosed herein may be implemented. As shown in FIG. 1, the environment can include a client computing device 11, and a server computing device 13 (or other device) in communication with the client computing device 11 via one or more networks 15. The one or more networks 15 can include, for example, a local area network (LAN), a wide area network (WAN) such as the Internet, and/or any other appropriate network.

The client computing device 11 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a virtual or augmented reality computing device), and the present disclosure is not limited thereto. In various implementations, the client computing device 11 can include a content access application 110, one or more third-party applications 112A~N, data storage 116, and optionally include an automated assistant 114 (which can be a "first-party application", by default, installed at the client computing device). In some implementations, a user of the client computing device 11 can interact with the content access application 110, the one or more third-party applications 112A~N, and/or one or more smart devices (not shown in FIG. 1) that are in communication with the client computing device 11, all via the automated assistant 114.

In various implementations, the content access application 110 can be a stand-alone media player, a web browser, or a social media application, and the present disclosure is not limited thereto. The content access application 110 can include a rendering engine 1101 that identifies and retrieves media content 17 (e.g., video content, audio content, slides) for rendering in a visible area of the content access application 110 of the client computing device 11. As a non-limiting example, the rendering engine 1101 can render a user interface 1103, of the content access application 110, that shows an initial video frame of a video content at the client computing device 11. The third-party applications 112A-N can include, for example, a note-taking application, a shopping application (for grocery, clothing, furniture, department store, ticket, transportation, hotel, trip-planning, food ordering and delivery, courses, tutoring or test preparation), a messaging application, and/or any other appropriate applications (or services), installed at or accessible, at the client computing device 11. In some implementations, a user of the client computing device 11 may have a registered account associated with one or more of the third-party applications 112A~N.

The server computing device 13 can be, for example, a web server, a proxy server, a VPN server, or any other type of server as needed. In various implementations, the server computing device 13 can include a content-parsing engine 130, a content classification engine 132, and a suggestion engine 134. In various implementations, the content-parsing engine 130 can receive media content accessible via the content access application 110 (e.g., a video blog uploaded by a registered user of the content access application 110, for share with other users of the content access application 110), and/or metadata associated with the media content (e.g., title, descriptions if any, captions recognized via speech recognition, comment made to media content). Alternatively, instead of the media content itself, the content-parsing engine 130 can access the media content (and/or metadata associated with the media content) by retrieving and parsing an address (e.g., URL) of the media content.

In some implementations, the content-parsing engine 130 can determine whether the retrieved media content (e.g., a video) and/or the associated metadata include one or more keywords, based on which the content classification engine 132 can determine whether the retrieved media content falls within any content category (sometimes referred to as "category" instead of "content category"), of one or more predefined content categories (sometimes referred to as "predefined categories", which include a recipe category, a trip-planning category, etc.). As a non-limiting example, the content-parsing engine 130 may receive only a video without any captions and without a defined title (e.g., a locally saved video with an undefined title), and in this case, the content-parsing engine 130 will have to process the video to determine whether a transcription of the video (and/or embedded textual includes one or more keywords or key terms, and/or whether one or more target objects are detected from video frames (or image frames in case of slides) of the video. For instance, the content-parsing engine 130 can determine that the transcription of the video includes key terms such as "how to cook" "recipe" and/or "ingredients", and using these key terms, the content classification engine 132 can generate a classification label (e.g., here, a "recipe" label) for the video, indicating that the video is classified into a first content category (e.g., a recipe category), of the plurality of predefined content categories. Alternatively or additionally, the content-parsing engine 130 can detect one or more objects from video frames of the video includes, and the content classification engine 132 can generate the "recipe" label for the video based on identifying one or more key objects (e.g., kitchen, chopping board, raw meat, chopped vegetables, bottle of spices or oil, cooking tools, a list of the ingredients, etc.) from the one or more detected objects and/or key term(s) determined from the transcription of the video.

Optionally, the classification label (e.g., the "recipe" label) may be displayed to a user of the content access application 110 that encounters the media content, signaling to the user that the media content provides a recipe. Or, the classification label may not be displayed to the user of the content access application 110 at all. Optionally, the content classification engine 132 can additionally generate a confidence measure which indicates how confidence the classification label (e.g., a recipe label for the video) is generated accurately.

Continuing with the above non-limiting example, the content-parsing engine 130 may, instead of receiving only the video, receive an address of the video and parse the address to retrieve not only the video, but also metadata of the video. The metadata of the video can include (1) textual data, including but not limited to: a title of the video, descriptions of the video (by video creator, an editor, or a user who shares the video, etc.), captions saved for the video, comment made by reviewers of the video, and optionally (2) non-textual data, such as temporal data associated with the video. In this case, the content-parsing engine 130 may first process the metadata associated with the video to extract the textual data from the metadata, and the content classification engine 132 determines whether the video falls into any content category of the one or more predefined content categories using the extracted textual data.

For instance, the extracted textual data can include one or more key terms (e.g., key term "recipe" detected from the title of the video, i.e., "kimchi recipe"), based on which, the content classification engine 132 can determine that the video belongs to the first content category (i.e., the recipe category). It's noted that If no key terms are detected based on processing the metadata, the content-parsing engine 130 can be called by the content classification engine 132 to process the video (i.e., processing audio data of the video to recognize a transcription of the video, and/or processing video frames of the video to determine one or more objects shown in the video frames). The content classification engine 132 can then again determine whether the video falls into any content category of the one or more predefined content categories, using the transcription and/or the one or more objects. If the content classification engine 132 still determines that the video does not fall into any of the one or more predefined content categories based on the processed video in addition to the aforementioned metadata, the content classification engine 132 can assign a "skip" label or a "null" classification label to the video so that the video does not need to be further processed, for a suggestion (e.g., actionable suggestion) to be generated for the video.

Optionally, the server computing device 13 can include a content extraction engine 136, where the content extraction engine 136 extract target content from the media content such as a video, using content extraction parameter(s) for a classification label that is assigned to the media content. For example, for a video providing multiple songs all performed by a same singer, the video may be assigned a predefined "music-singer" classification label, and the content extraction parameters for the predefined "music-singer" classification label can be singer extraction parameter(s) including, for example, a singer name parameter. In this example, the content extraction engine 136 can extract singer information (name of the singer, a piece of her voice, etc.) from the video using the singer extraction parameter(s) as the target content of the video. As another example, for a video providing multiple songs performed by different singers, the video may be assigned a predefined "music-song" classification label, and the content extraction parameters for the predefined "music-singer" classification label can be song extraction parameter(s) including, for example, a title parameter and/or a lyric parameter. In this example, the content extraction engine 136 can extract song information (title of the song, lyric of the song, etc.) from the video using the song extraction parameter(s) as the target content.

In various implementations, the suggestion engine 134 can include a suggestion-generating engine 1341, to generate a suggestion that includes a textual portion (i.e., in natural language) and optionally a non-textual portion (i.e., emojis, symbols, etc.). The suggestion-generating engine 1341 can generate the suggestion tailored to the classification label (or, the content category into which the video is classified), where natural language content of the suggestion can be based on the one or more key terms being identified by the content classification engine 132 from the metadata (or from the video), and/or based on the one or more target objects being identified by the content classification engine 132 from video frame(s) of the video. Alternatively, in some implementations, the suggestion-generating engine 1341 can generate the suggestion based on the target content extracted by the content extraction engine 136 from the media content (e.g., video). For example, when the content extraction engine 136 extract a name of a singer from a video as the target content, the suggestion-generating engine 1341 can determine an action of "add new songs of the singer to your playlist" based on identifying/finding new songs using the name of the singer, and generate a suggestion that includes a textual portion describing the action (e.g., "add the new songs of the singer to your playlist") and/or that includes an embedded link to cause the action to be performed. As another example, when the content extraction engine 136 extract lyrics of a song from a video as the target content, the suggestion-generating engine 1341 can determine an action of "download the song", and generate a suggestion that includes a textual portion describing such action of "download the song" and/or an embedded link that causes the song to be downloaded.

In various implementations, the suggestion can be an actionable suggestion that suggests an action performable by one or more of the third-party applications 112A~N (or by the automated assistant 114). In this case, the suggestion engine 134 can include an application selection engine 1345, where the application selection engine 1345 can select an application, of the one or more of the third-party applications 112A~N and/or the automated assistant 114, to perform the action suggested by the actionable suggestion. The application selection engine 1345 can inform the suggestion-generating engine 1341 of the selected application, and the suggestion-generating engine 1341 can correspondingly generate the actionable suggestion by including information associated with the selected application (e.g., name or icon representing the selected application) in the actionable suggestion. For example, for an action of "download song A", the application selection engine 1345 can determine a music app (for which a user has a registered account that provide access to downloading service of the music app) that provides song A for downloading as the third-party application to perform the action (i.e., "download song A").

In some implementations, the application selection engine 1345 can select an appropriate application by first generating, for each of the third-party applications 112A~N and/or the automated assistant 114, a score, and then ranking the third-party applications 112A~N and/or the automated assistant 114 using the generated scores. The application having the highest ranked score may be selected as the appropriate application. In some implementations, given a first third-party application 112A, the application selection engine 1345 can determine a score for the first third-party application 112A, for example, based on target content determined from the video, the metadata associated with the video, and/or user data (e.g., user setting, user historical data, etc.).

In various implementations, the suggestion engine 134 can further include a suggestion-rendering engine 1343 that causes the generated suggestion to be rendered in a selectable manner (e.g., a selectable element), along with the video. For example, the suggestion-rendering engine 1343 can cause the generated suggestion (e.g., actionable suggestion 171) to be rendered as an overlay over a portion of the video 17.

In various implementations, the generated suggestion can be rendered at a predetermined moment, in a predetermined format, and/or for a predefined period of time. For example, the generated suggestion can be rendered by the suggestion-rendering engine 1343 when the video has been played for a predetermined period (e.g., approximately 30 seconds since the video starts), where the predetermined period can be selected based on statistic user data (e.g., historical user data) and indicates that the video has attracted attention of a user who is watching the video. As another example, the generated suggestion can be rendered by suggestion-rendering engine 1343 when a video frame containing the recipe is displayed. The generated suggestion can, for example, be displayed for a predefined period of time (e.g., approximately 5 seconds), where the predefined period of time can also be determined based on the statistical user data. The generated suggestion can be rendered using a predetermined format (e.g., size, appearance, and location). For example, the generated suggestion can be rendered a bottom area that minimizes possible negative impact on a user's video-watching experience, or can be rendered as an overlay in a central area of the video while having the video paused to get the most possible attention from the user. However, examples here are for illustrative purposes only and more examples may be provided throughout this disclosure. The examples here are not intended to be limiting.

Figure 2A:
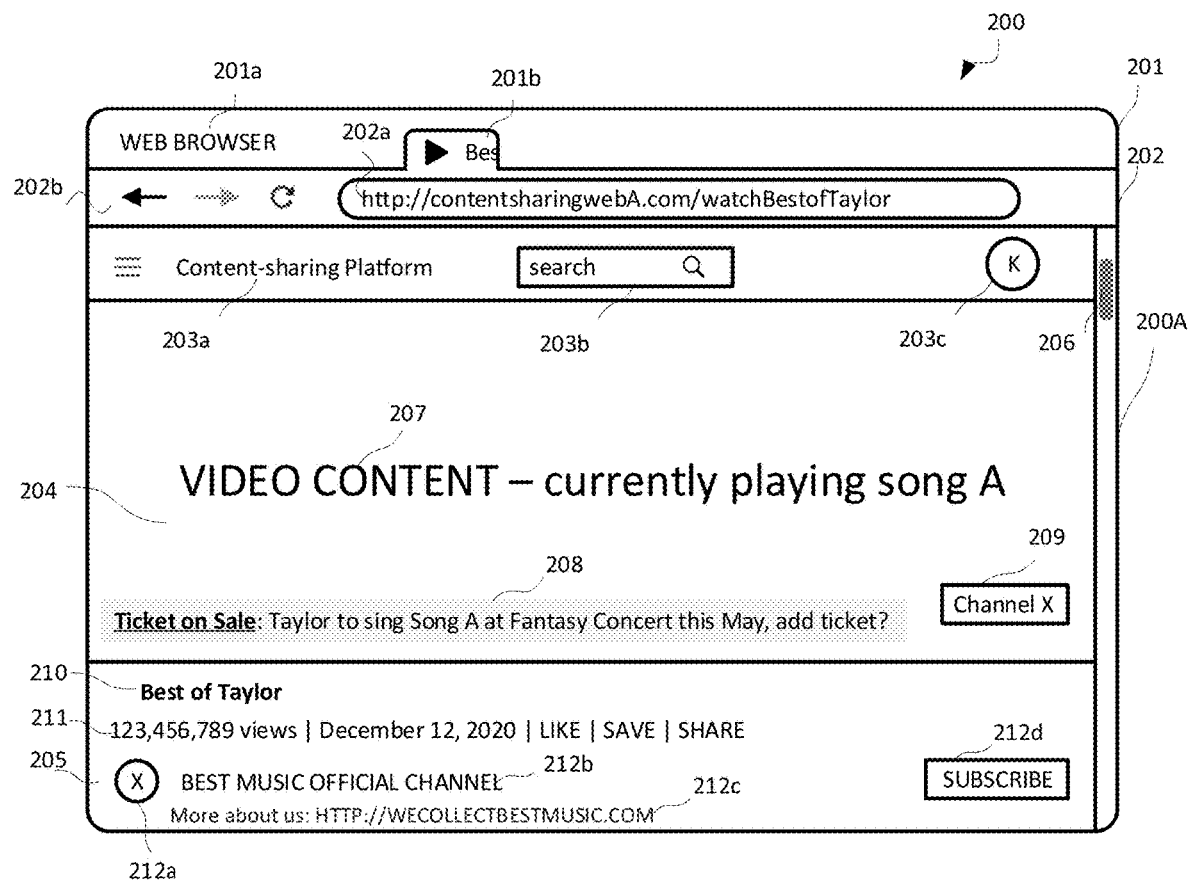
FIG. 2A depicts an example user interface showing a suggestion, in accordance with various implementations.
Figure 2B:
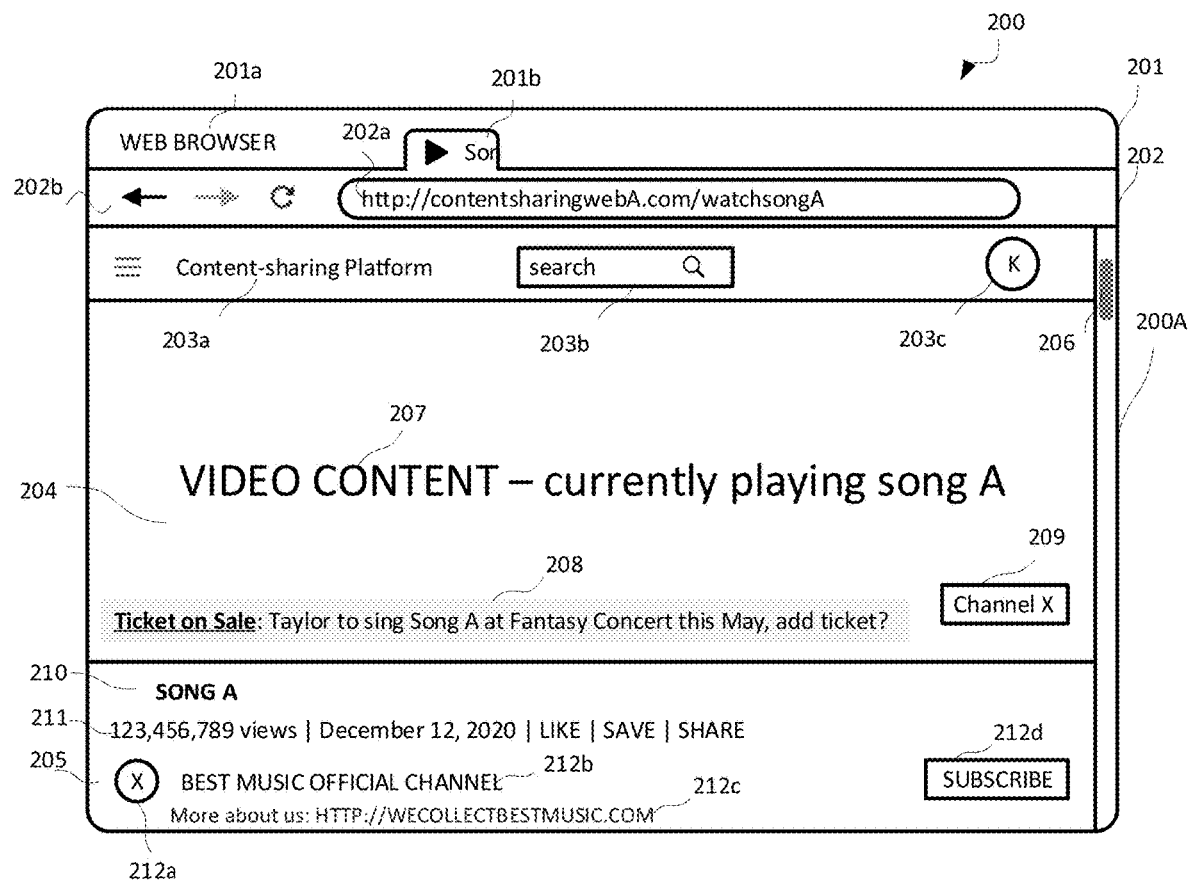
FIG. 2B depicts another example user interface showing a suggestion, in accordance with various implementations.

FIG. 2A depicts an example user interface showing a suggestion generated by the suggestion-rendering engine 1343 in FIG. 1, in accordance with various implementations. FIG. 2B depicts another example user interface showing a suggestion generated by the suggestion-rendering engine 1343 in FIG. 1, in accordance with various implementations. Referring to FIG. 2A, a user of a client computing device can open a web browser 201a and access a content-sharing platform 203 (for which the user may have a registered account 205) via the web browser 201a. The user may search for "Taylor's best songs" via textual input (or audio input) at a search bar 203b, and choose to watch a video having a title 210 (i.e., "Best of Tayler") from a list of media content (not shown in FIG. 2A) returned as search results for the user's search (i.e., "Taylor's best songs").

As shown in FIG. 2A, an interface 200 of the web browser 201a can include a first section 201 showing a name of the web browser 210a and a tab 201b that corresponds to media content 207 (e.g., video content of the video titled "Best of Taylor") currently being displayed at the content-sharing platform 203. The interface 200 of the web browser 201a can further include a second section 202 showing an address 202a of the media content 207, and optionally a selectable button 202b, where the selectable button 202b can be selected to open a page showing account information of a user account associated with the web browser 201a. The interface 200 of the web browser 201a can further include a third section 200A (also known as "user interface of the content-sharing platform") including a first selectable element 203a (e.g., a name or symbol representing the content-sharing platform, which can contain an embedded link to a homepage of the content-sharing platform), a search bar 203b, a second selectable element 203c that represents a registered account (e.g., an account with a user name of "K") of the content-sharing platform, a scrollbar 206, and a media-displaying region 204 that displays the media content 207 (e.g., currently playing song A as part of video content titled "Best of Taylor").

The third section 200A can further include a third selectable element 209 that contains an embedded link to a channel (e.g., "Channel X", which collects all media content associated with (e.g., uploaded, liked, saved, shared, etc.) the registered account "K". The third section 200A can further include a content-introduction region 205 located adjacent to (e.g., below) the media-displaying region 207. The content-introduction region 205 can include/display a title 210 of the media content 207, a function row 211 that displays temporal information related to the media content 207 (number of views up to a current moment, date of content publication, etc.) and selectable buttons (e.g., like, save to a folder, share with friends or family).

The content-introduction region 205 can further include channel information associated with a user of the content-sharing platform that uploads the media content 207 for sharing with others. For example, the content-introduction region 205 can include a selectable button 212a that contains an embedded link to a homepage of the channel X, a name 212b of the channel X (i.e., "BEST MUSIC OFFICIAL CHANNEL"), an introduction 212c of the channel X (i.e., "More about us: HTTP://WECOLLECTBESTMUSIC.COM . . . "), and/or a selectable button 212d that allows a user of the content-sharing platform to subscribe to the channel X. Optionally, the content-introduction region 205 can further include: an introduction (not shown in FIG. 2A, the display of which may require a user to scroll down the scrollbar 206) to the media content 207 below the introduction 212c of the channel X, and/or a comment area for other users to comment about the media content 207 and possibly receive replies from a user of the content-sharing platform that owns the channel X. Here, the name 212b of the channel X, the introduction 212c of the channel X, the introduction to the media content 207, comments and replies (if there are any) from the comment area, as well as aforementioned title 210 of the media content 207 and temporal information related to the media content 207, can be referred to as, or collected as part of, "metadata" associated with the media content 207.

In various implementations, the user interface 200A of the content-sharing platform can display an actionable suggestion 208 in natural language (e.g., "Ticket on sale: Taylor to sing Song A at Fantasy Concert this May"). The actionable suggestion 208 in its entirety ("Ticket on sale: Taylor to sing Song A at Fantasy Concert this May"), or a portion thereof ("Ticket on sale"), can be selectable to provide further information, for example, displayed using a pop-up window (not shown in FIG. 2A). In some implementations, a name of a particular song (i.e., "song A", which can be target content of the media content 207, extracted to generate the suggestion 208) may not be displayed at the user interface 200A of the content-sharing platform that displays the video content titled "Best of Taylor" nor identified from the metadata associated with the video content titled "Best of Taylor", but nonetheless may be detected by processing video frames or audio data of the video content titled "Best of Taylor". In some implementations, referring to FIG. 2B, the name of the particular song (i.e., "song A") may be displayed as the tile 210 of the media content 207 at the user interface 200A, meaning the name of the particular song (i.e., "song A") may be detected from the metadata associated with the media content 207.

Figure 3:
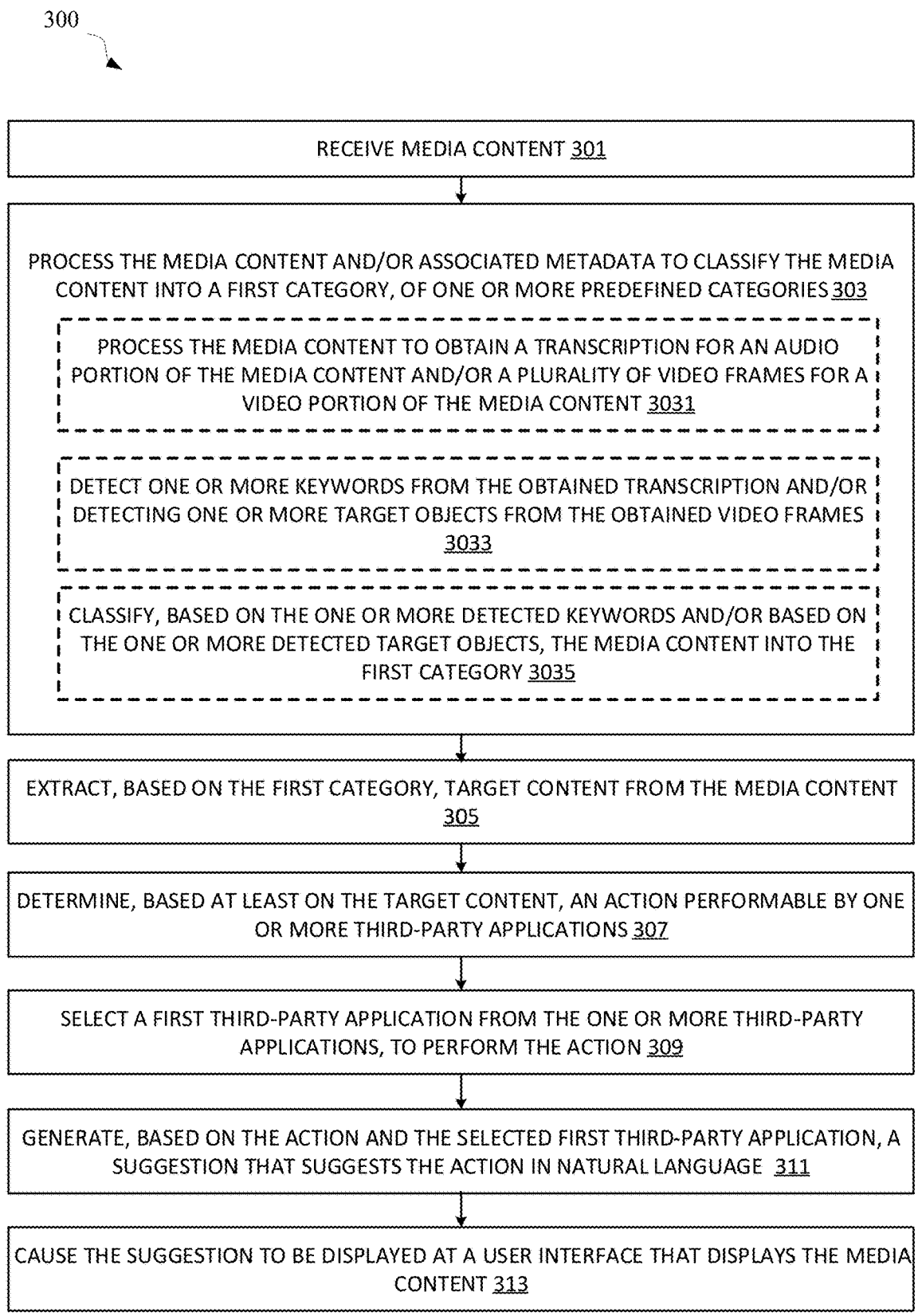
FIG. 3A is a flowchart illustrating an example method of displaying an actionable suggestion for media content, in accordance with various implementations.
FIG. 3B is a flowchart illustrating another example method of displaying an actionable suggestion for media content, in accordance with various implementations.

FIG. 3 is a flowchart illustrating an example method of displaying an actionable suggestion for media content, in accordance with various implementations. For convenience, the operations of the method 300 are described with reference to a system that performs the operations. The system of method 300 includes one or more processors and/or other component(s) of a client device and/or of a server device. Moreover, while operations of the method 300 are shown in a particular order, this is not meant to be limiting. One or more operations may be reordered, omitted, or added.

As shown in FIG. 3, in various implementations, a method 300 of displaying an actionable suggestion for media content can be performed by a system, where at block 301, the system receives media content (e.g., a video). Alternatively, instead of receiving the media content, an address (a local file address or a URL) of the media content can be received. In this case, the address of the media content can be parsed and the media content can be retrieved using the parsed address. The media content here can be a video (tourism video, cooking video, movie trailer, shows, a vlog, a recorded dog training session, a yoga class, etc.), an audio (music, audiobook, class recording, a recorded interview with a celebrity, etc.), a slideshow with or without narration, or any other appropriate form.

Figure 4A:
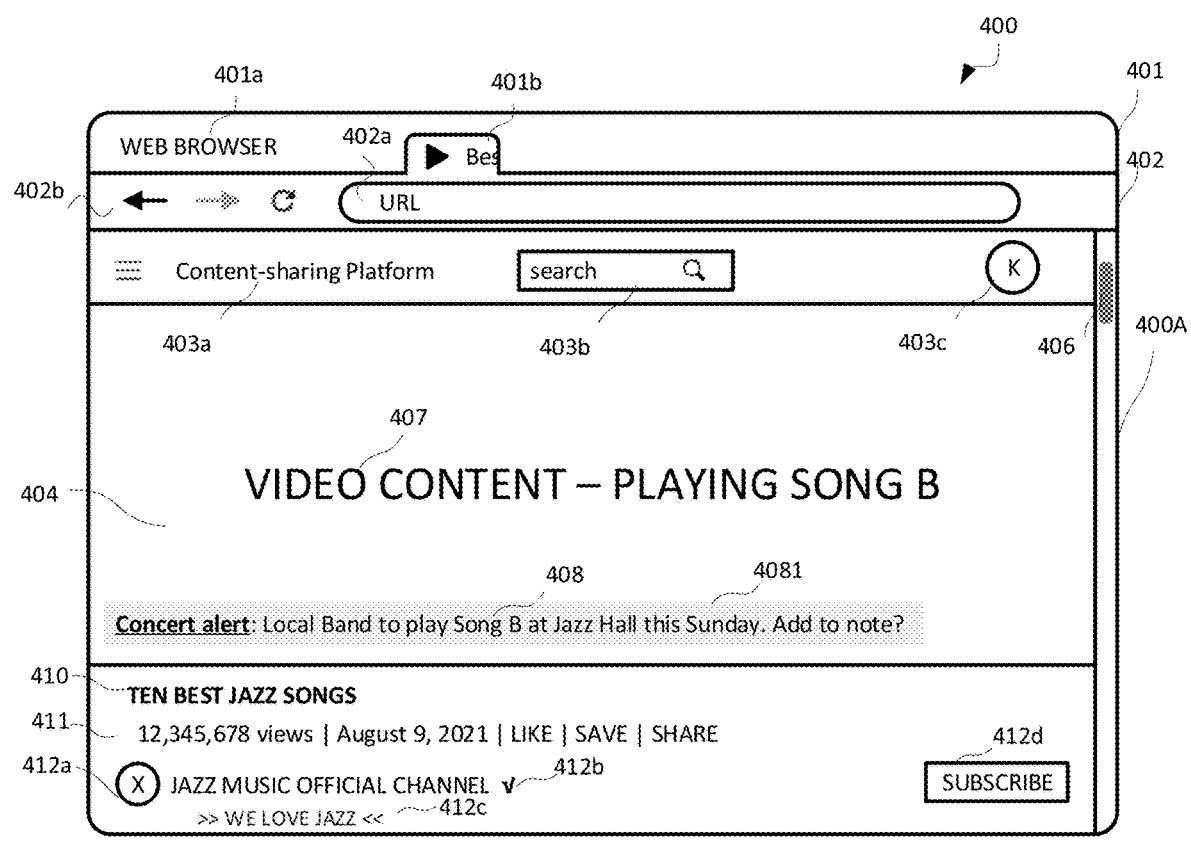
FIG. 4A, FIG. 4B, FIG. 4C, and FIG. 4D together illustrate an example in which an actionable suggestion is provided for media content that is classified into a first category, for user interaction, in accordance with various implementations.

As a non-limiting example, referring to FIG. 4A, media content (i.e., video content 407) can be displayed at a user interface 400A of the content-sharing application 403a, being part of an interface 400 of a web browser 401a. In this example, a user may have a registered account 403c (e.g., account "K") for the content-sharing application 403a, and the interface 400 of the web browser 401a can have a tab 401b indicating that the user is currently using the content-sharing application 403a to access the video content 407. The interface 400 of the web browser 401a can further include a URL 402a of the video content 407, and one or more buttons 402b that the user may click on to go back to a previous webpage, go forward, or refresh a current page.

Further in this example, the user interface 400A of the content-sharing application 403a can have a search bar 403b, a media-displaying region 404 that displays the video content 407, a channel-X 409, a title 410 (e.g., "TEN BEST JAZZ SONGS") of the video content 407, an information bar 411 displaying additional information or functions associated with the video content 407, a channel button 412a that is selectable to open a homepage of a channel (e.g., channel "X") that collects the video content 407, a channel name 412b (e.g., "JAZZ MUSIC OFFICIAL CHANNEL ✓"), additional channel (or video) information 412c (e.g., "WE LOVE JAZZ"), and a subscribe button 412d that is selectable to subscribe to the channel 412a.

In various implementations, at block 303, the system can process the media content and/or metadata associated with the media content, to classify the media content into a first category, of one or more predefined categories. Here, the one or more predefined categories can include but are not limited to: a recipe category, a music-recommendation category (or simply "a music category"), a movie-recommendation category (or simply "a movie category"), a trip-planning category (or simply "a tourism category"), a tutoring category, that can be individually defined prior to the processing.

As a non-limiting example, referring to FIG. 4A, video content 407 (the media content), and/or metadata such as the title 410 (i.e., "TEN BEST JAZZ SONGS") of the video content 407 and the channel name 412b (i.e., "JAZZ MUSIC OFFICIAL CHANNEL ✓") can be processed to classify the video content 407 into the music category, which is one of the predefined categories.

Optionally, in some implementations, the system can process the media content and/or metadata associated with the media content to classify the media content into the first category (block 303) by: at block 3031, processing the media content to obtain a transcription for an audio portion of the media content. Alternatively or additionally, at block 3031, the media content can be processed to obtain a plurality of video frames for a video portion of the media content. Processing the media content can be useful in situations where the media content is received without desired or representative content-indicative metadata. For example, a video may be received along with an unspecified title (e.g., "video1"), a creation date/time of the video, and/or a size of the video, but none of this type of metadata indicates what the video is about. In another situation, the video may be received with a title "recipe" indicating that the video content is about a recipe, while the video is in fact teaching how to pronounce the word "recipe". In an additional situation, when an address of the video is provided, the address of the video may lead to the video itself (or a webpage embedded with the video but displays no specific description about the video). In these situations, classifying the video using merely the metadata associated with the video can be inaccurate. Processing the video (e.g., processing video frames and/or audio data associated with the video) to understand video content of the video can therefore improve the accuracy of the classification, which helps subsequently optimize the type (or content) of an actionable suggestion that is delivered for consideration by relevant users (e.g., video watchers).

In some implementations, the system can process the media content and/or metadata associated with the media content to classify the media content into the first category (block 303) by further: at block 3033, detecting one or more keywords from the transcription obtained from the audio portion of the media content. Alternatively or additionally, at block 3033, detecting one or more target objects (e.g., by identifying a graphical or textual representation of the target objects) is performed on the plurality of video frames obtained from the video portion of the media content. In these implementations, the system can process the media content and/or metadata associated with the media content to classify the media content into the first category (block 303) by further: at block 3035, classifying the media content into the first category based on the one or more detected keywords (and/or based on the one or more detected target objects).

As a non-limiting example, a URL may be retrieved and leads to a webpage showing a video titled "Taylor". In this example, processing metadata associated with the video (i.e., the video title "Taylor") can hardly classify the video into an appropriate category into one or more predefined categories (e.g., music, recipe, traveling, etc.). A user seeing the video title "Taylor" may think it is a biography video, while the video may be a music mix having multiple pieces respectively selected from the most popular songs of Taylor. In situations like this, instead of or in addition to processing the video tile (i.e., "Taylor"), the video itself can be processed to obtain an audio portion of the video and a plurality of video frames that form the video. The audio portion of the video can be processed using speech recognition to generate a transcription of the video. Based on the transcription of the video, one or more keywords can be detected from the video. For instance, lyrics of one or more songs of Taylor can be detected from the transcription of the video as the keywords. Alternatively or additionally, based on the plurality of video frames, one or more target objects (e.g., a scene, a graphical or textual representation of an item) can be detected from the video. For instance, an image of Taylor in her famous performance outfit or a scene widely known from Taylor's music videos may be detected from the plurality of video frames as a target object. Further, based on the one or more detected keywords (e.g., lyrics) and/or based on the one or more detected target objects (e.g., the image or scene), the video can be classified into the first category or another particular category (e.g., music category), of a plurality of predefined categories.

In various implementations, at block 305, the system can extract, based on the media content being classified into the first category, target content from the media content. For example, the media content (e.g., a cooking video) may be classified into a first category (i.e., recipe category). In this example, a list of ingredients for the recipe can be extracted as the target content from the media content, for instance, using content extraction parameters (e.g., a food name extraction parameter and a food quantity extraction parameter) that are assigned to (or predefined for) the recipe category.

As a non-limiting example, referring to FIG. 4A, based on the video content 407 being classified into the music category, target content (e.g., names of the ten individual jazz songs that includes song B) can be determined/extracted from the transcription of the video content 407 and/or video frames of the video content 407 using music extraction parameter(s) that correspond to the music category. The music extraction parameters can include, for example, a lyrics extraction parameter and/or a song name extraction parameter. For instance, lyrics of the ten jazz songs can be extracted from the transcription of the video content 407 based on the lyrics extraction parameter, and the lyrics of the ten jazz songs can be used to determine the name for each of the ten jazz songs, where the names of the ten jazz songs (and/or the lyrics) are determined as the target content. Alternatively or additionally, the names of the ten jazz songs can be extracted from one or more video frames of the video content 407 based on the song name extraction parameter, and the names of the ten jazz songs can be determined as the target content.

In various implementations, at block 307, the system can determine, based at least on the extracted target content, an action performable by one or more third-party applications. For instance, when the extracted target content is a recipe to cook shrimp and grits, the action can be adding ingredients (shrimp, corn grits, bacon, scallion, etc.) listed in the recipe to a shopping cart of a third-party application (e.g., a grocery-shopping application), or creating an electronic note recording those ingredients. In some implementations, the action can be additionally determined based on user historical data (e.g., online purchase receipt, frequency of using widgets such as a note-taking application to take notes), statistical data (e.g., the most popular action a number of users perform when viewing the media content), application data (e.g., whether an application to perform the action is installed at a client computing device with which the user browses the media content), and other appropriate data.

As a non-limiting example, referring to FIG. 4A, an action (e.g., add to note the following information: "Concert alert: Local Band to play Song B at Jazz Hall this Sunday") can be determined based on the target content (e.g., lyrics of Song B regardless of whether Song B collected in the video content 407 is performed by its original singer or by the local band), and/or based on the user historical data (e.g., the registered user K of the content-sharing platform 403a historically frequently added to note information when viewing video content that is of the music category). Continuing with this example, instead of or in addition to adding the information, i.e., "Concert alert: Local Band to play Song B at Jazz Hall this Sunday" to the note-taking app, more detailed information (see graphical element 4082 in FIG. 4D as an example) of the concert can be added to the note-taking app.

In various implementations, at block 309, the system can, based on the determined action, select a first third-party application from the one or more third-party applications to perform the action. For example, when the action is to book two movie tickets, a particular movie ticket application can be selected from one or more movie ticket applications to book the two movie tickets. In some implementations, the one or more movie ticket application can be ranked based on their ranking scores, and the movie ticket application to which a highest ranking score corresponds can be selected to book the two movie tickets. Here, a ranking score can be generated for each of the one or more movie ticket applications, based on factors including but not limited to: device data (e.g., whether the movie ticket application is installed at a client computing device a user is current accessing the media content), historical user data (e.g., whether the user has ordered movie ticket using the movie ticket application, user seems to prefer watching movies on Saturday afternoon based on historically ordering movie tickets on Saturday afternoon), and availability data (e.g., when the movie ticket is available via the movie ticket app, which can be a mobile app developed by a particular cinema). In some implementations, the third-party application to perform the action can be predetermined, so that the ranking process can be omitted.

As a non-limiting example, referring to FIG. 4A, given the determined action (e.g., add to note the following information: "Concert alert: Local Band to play Song B at Jazz Hall this Sunday"), a note-taking application can be selected from note-taking applications provided by different developers to perform the action, where the selected note-taking application is a local widget the user uses most frequently (most recently, or by default) to add notes, reminders, shopping list, etc.

In various implementations, at block 311, the system can generate, based on the action and the selected first third-party application, a suggestion including a textual portion that suggests the action. Optionally or additionally, the textual portion can specify the selected first third-party application that is to perform the action. In various implementations, the suggestion (or a portion thereof, such as an icon) can be embedded with a selectable link, which when selected, cause the action to be performed or cause an interface of the selected third-party application to be opened as an overlay of the media content for further user interaction. For example, referring to FIG. 4A, a suggestion 408 can include a textual portion, i.e., "Concert alert: Local Band to play Song B at Jazz Hall this Sunday. Add to note?". In this example, the suggestion 408 suggests an action, i.e., add to note the concert alert, i.e., "Local Band to play Song B at Jazz Hall this Sunday", or "Concert alert: Local Band to play Song B at Jazz Hall this Sunday".

In various implementations, at block 313, the system can cause the suggestion to be displayed at a user interface that displays the media content. As a non-limiting example, referring to FIG. 4A, the suggestion 408 can be displayed in a selectable button 4081, along with the video content 407, at the user interface 400A of the content-sharing application 403a. Optionally, the suggestion 408 can be displayed as a selectable pop-up small window that has minimized negative impact on user K's experience in watching the video content 407. Optionally, the suggestion 408 can be displayed when song B starts playing, and the display of the suggestion 408 can last a predetermined period of time (e.g., 10 s) during which the song B still plays. Alternatively, the suggestion 408 can be displayed in a larger size and in a central area of the media-displaying region 404, and when the suggestion 408 is displayed, the song B can be paused and later can resume playing when the suggestion 408 disappears. The displaying manner (e.g., size, location, duration, shape, color, etc.) of the suggestion 408 (or other suggestions) is not limited to examples provided herein.

Figure 4B:
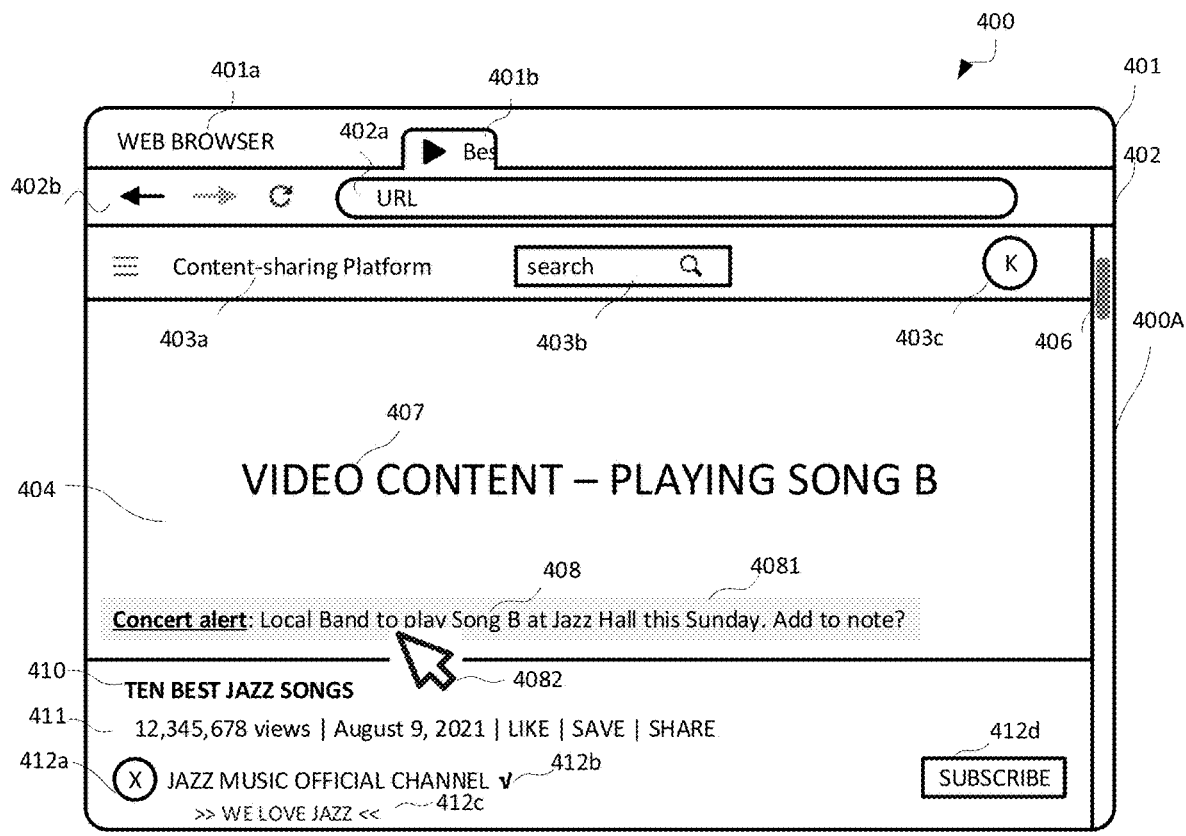
Figure 4C:
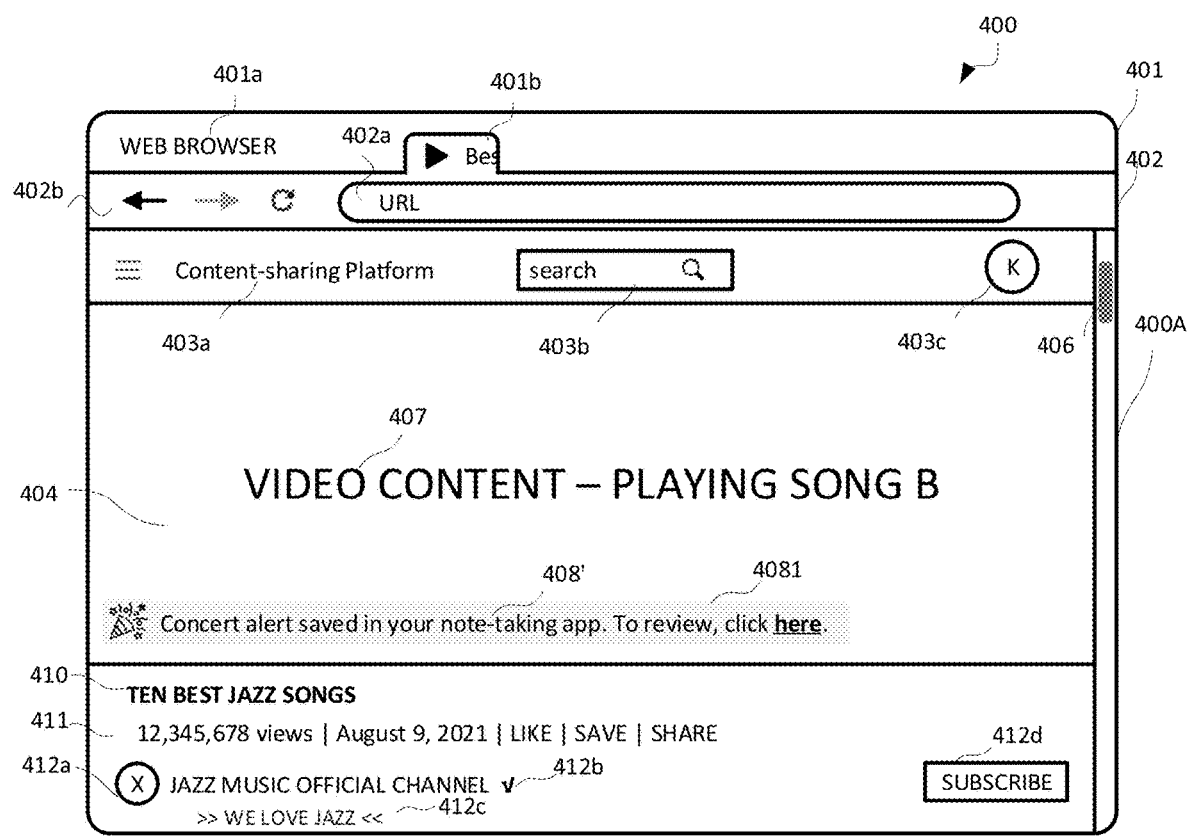

In some implementations, referring to FIGS. 4B and 4C, after the user K selects the selectable suggestion 408 via for example a mouse cursor 4082, the action suggested by the suggestion 408 is performed and correspondingly, the selectable element 4081 can be modified to display a confirmation message 408' (e.g., "Concert alert saved in your note-taking app. To review, click here." In this case, the size, location, and other parameters of the selectable element 4081 can be adjusted based on the length, font and other parameters of the confirmation message 408', and the present disclosure is not limited thereto.

Figure 4D:
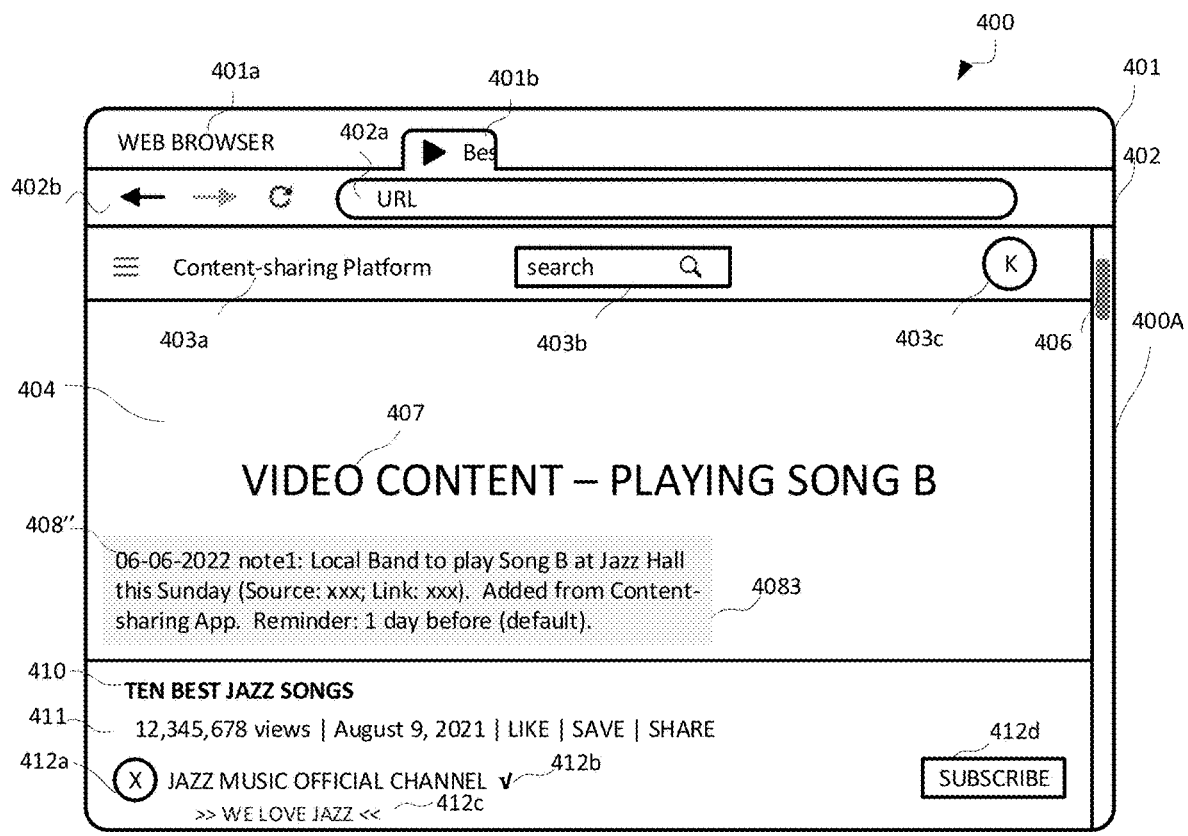

In some implementations, referring to FIG. 4D, the user K may click the selectable element 4081 (or a portion thereof, e.g., an area showing the bolded and underline word "here") to review the note added to the note-taking app, where a screenshot of the note (or a portion 408" of the note, i.e., "06-06-2022 note1: Local Band to play Song B at Jazz Hall this Sunday (source: xxx; Link: xxx). Added from Content-sharing App. Reminder: 1 day before (default)") added to the note-taking app can be popped up as a graphical element 4083 at the user interface 400A of the content-sharing application 403a. Alternatively, instead of the screenshot, content of the note can be displayed as an overlay with respect to the video content 407, where format of such content can differ from what is correspondingly displayed in the note-taking app.

Figure 5A:
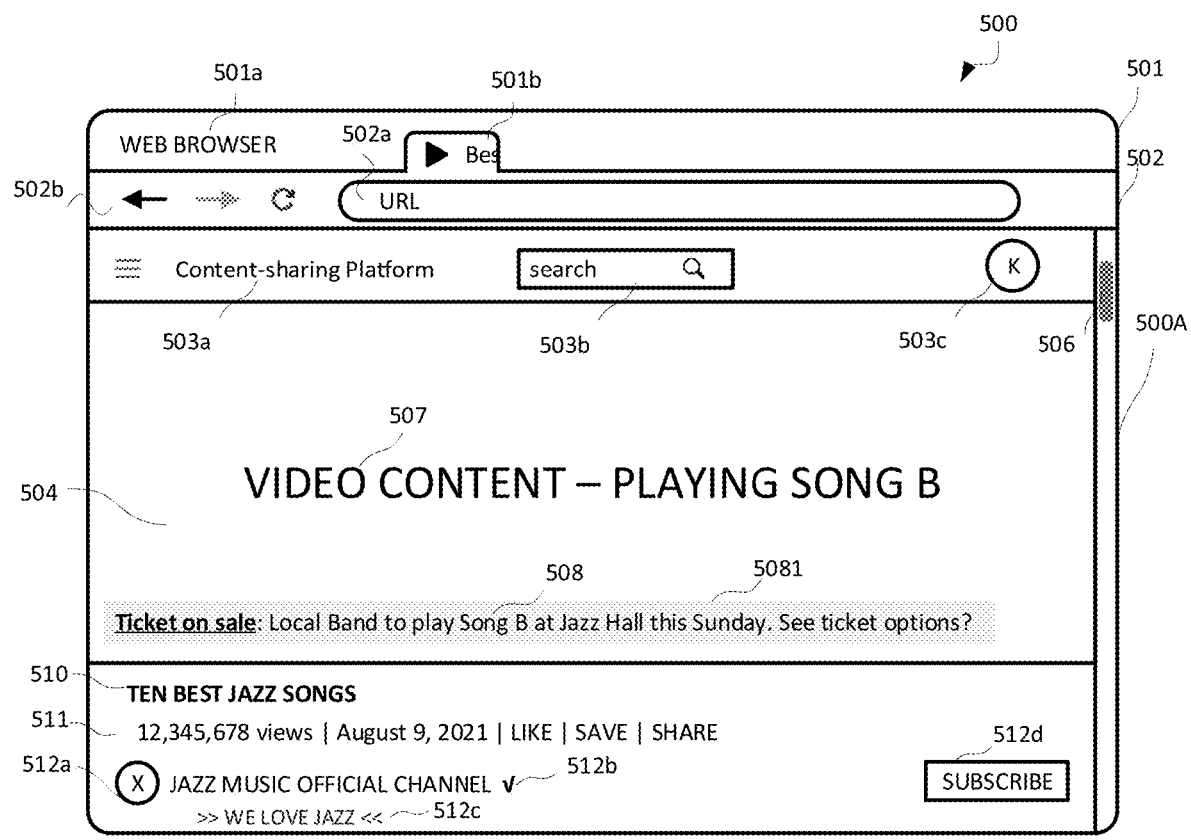
FIG. 5A, FIG. 5B, FIG. 5C, and FIG. 5D together illustrate another example in which an actionable suggestion is provided for media content that is classified into the first category, for user interaction, in accordance with various implementations.

FIGS. 5A, 5B, 5C, and 5D together illustrate an example in which an actionable suggestion is provided for a video that is classified into one of a plurality of predefined categories, for user interaction, in accordance with various implementations. As shown in FIG. 5A, video content 507 of the video can be displayed at a video-displaying region 504 of a user interface 500A of the content-sharing application 503a, where the user interface 500A can be part of an interface 500 of a web browser 501a. In this example, a user may have a registered account 503c (e.g., account "K") for the content-sharing application 503a, and the interface 500 of the web browser 501a can have a tab 501b indicating that the user is currently using the content-sharing application 503a to access the video content 507 of the video. The interface 500 of the web browser 501a can further include a URL 502a of the video, and one or more buttons 502b that the user may click on to go back to a previous webpage, go forward, or refresh a current page. The video can have a title 510 (e.g., TEN BEST JAZZ SONGS). Metadata associated with the video can include the title 510, information 511 such as viewing number and time and date for video creation, a name 512a of a channel that uploads the video and can be subscribed via button 512d, a name 512b of the channel 512a, and additional channel information 512c.

In some embodiments, based on metadata (e.g., the title 510 of the video) of the video, the video (or the video content 507) can be classified into a music category. Alternatively or additionally, the video content 507 can be processed to classify the video into the music category. Based on the video being classified into the music category, the video content 507 can be processed to extract target content (e.g., names for songs A~J). Based on the extracted target content, one or more actions tailored to the extracted target content can be determined. The one or more actions can include but are not limited to: purchasing to download one or more of the songs A~J via a first third-party application, and searching the Internet (and/or third-party application(s)) for a live concert that will play one or more of the songs A~J. Optionally, the one or more actions can be ranked, and a highest ranked action can be selected as the action to be performed. The highest ranked action can be performed by a corresponding third-party application, or by an automated assistant.

Based on the selected action (e.g., the highest ranked action) and/or the corresponding third-party application, a suggestion such as suggestion 508 can be generated and displayed in a selectable element 5081. The suggestion 508 can be in natural language (Ticket on sale: local Band to play Song B at Jazz Hall this Sunday. See ticket options?") and suggests an action to buy or check out ticket options for a concert that will play song B, one of the songs A~J.

Figure 5B:
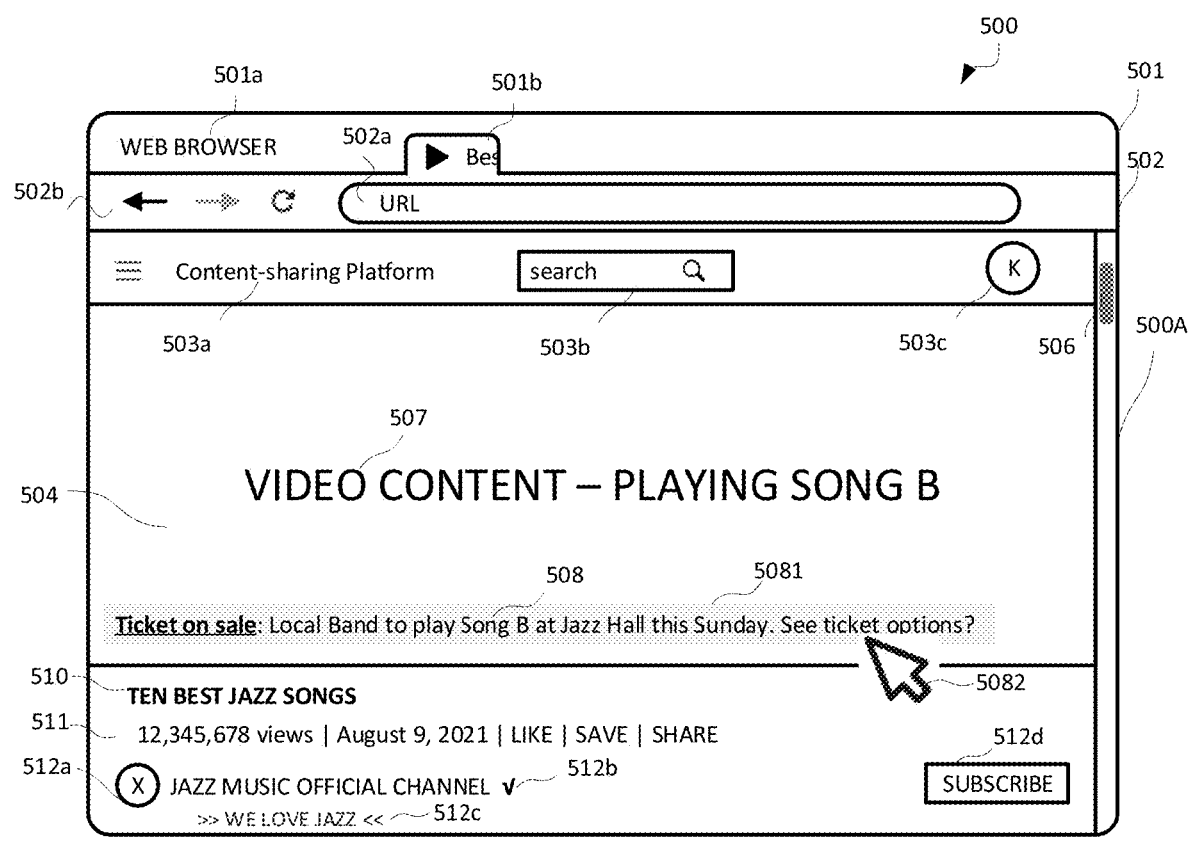
Figure 5C:
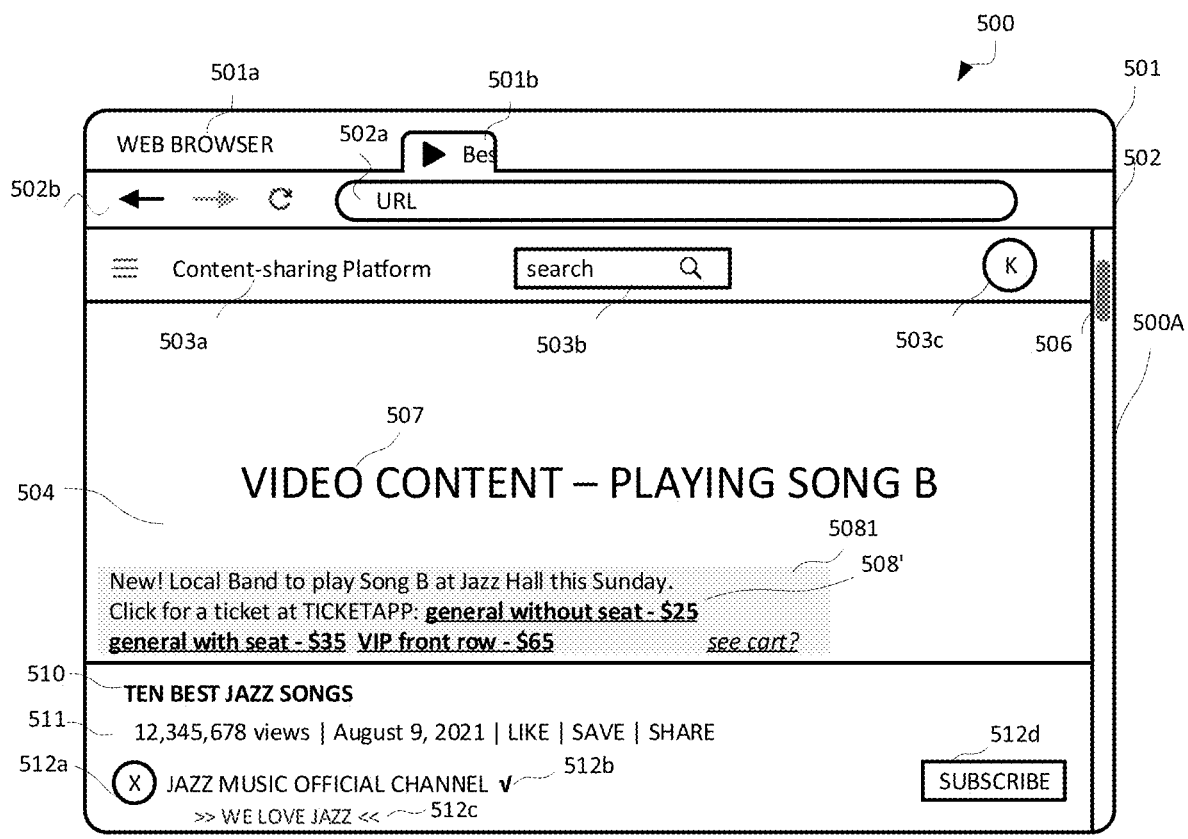
Figure 5D:
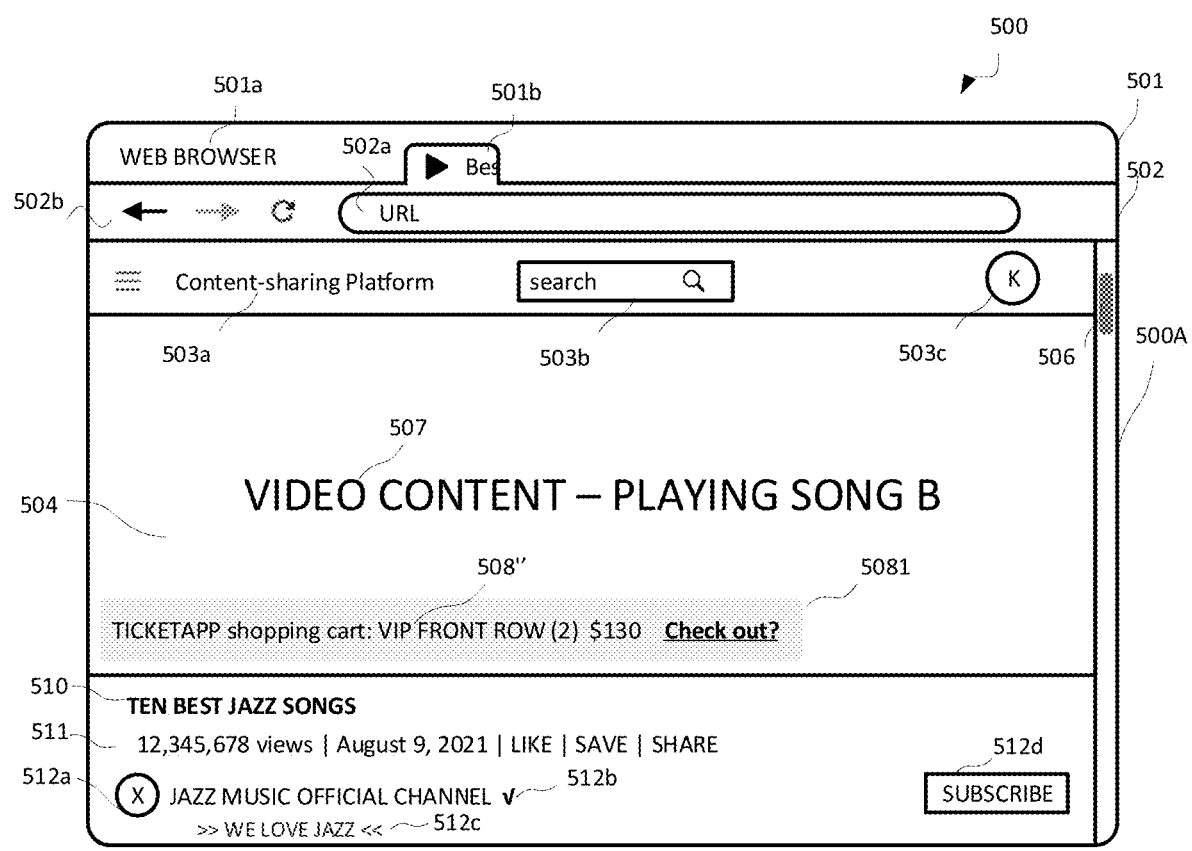

Referring to FIG. 5B and FIG. 5C, the user K can use a mouse cursor 5081 to select the selectable element 5081, and the selectable element 5081 can be updated with ticket information 508' (e.g., "New! Local Band to play Song B at Jazz Hall this Sunday. Click for a ticket at TICKETAPP: general without seat—$25, general with seat—$35, VIP front row—$65=>see cart?"). As shown in FIG. 5D, after the user K selects to add two VIP front row tickets, the selectable element 5081 can be updated to display confirmation information 5081" (e.g., "TICKETAPP shopping cart: VIP FRONT ROW (2) $130=>Check out?"), where the confirmation information 5081 can be embedded with a link to access the third-party application (i.e., TICKETAPP, or a website for the third-party application, "WWW.TICKET-APP.COM") associated with the action of buying or checking out ticket options for the concert that will play song B. In some implementations, the user K may select (e.g., click on) the confirmation information 5081 and a window may pop up as an overlay of the video content 507 for the user K to complete the checkout process without leaving the content-sharing application 503a (e.g., closing the tab 501b, or opening a new user interface or a new tab associated with the third-party application, TICKETAPP)

Alternatively, after the user K selects to add two VIP front row tickets, the selectable element 5081 can be updated to display confirmation information 5081" (e.g., "TICKETAPP shopping cart: VIP FRONT ROW (2) $130"). In this case, once the user K selects to add the two VIP front row tickets to a shopping cart of the TICKETAPP, the user K may choose to finish watching the video content 407 and then can resume the check-out process by opening the TICKETAPP, where the opened TICKETAPP can show a shopping bag with two added VIP front row tickets.

Figure 7A:
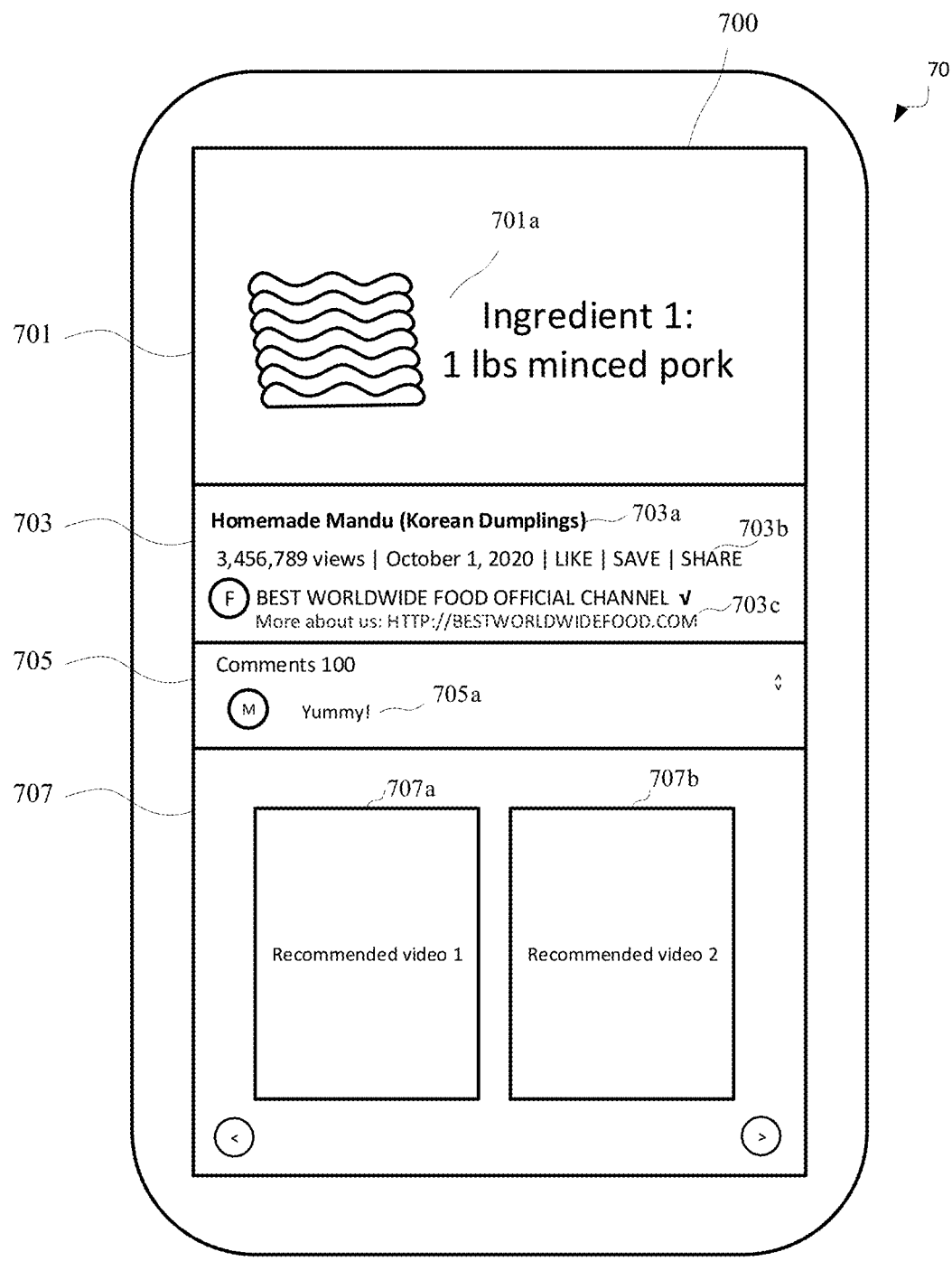
FIG. 7A and FIG. 7B illustrate an example in which an actionable suggestion is provided for media content that is classified into a second category, for user interaction, in accordance with various implementations.
Figure 7B:
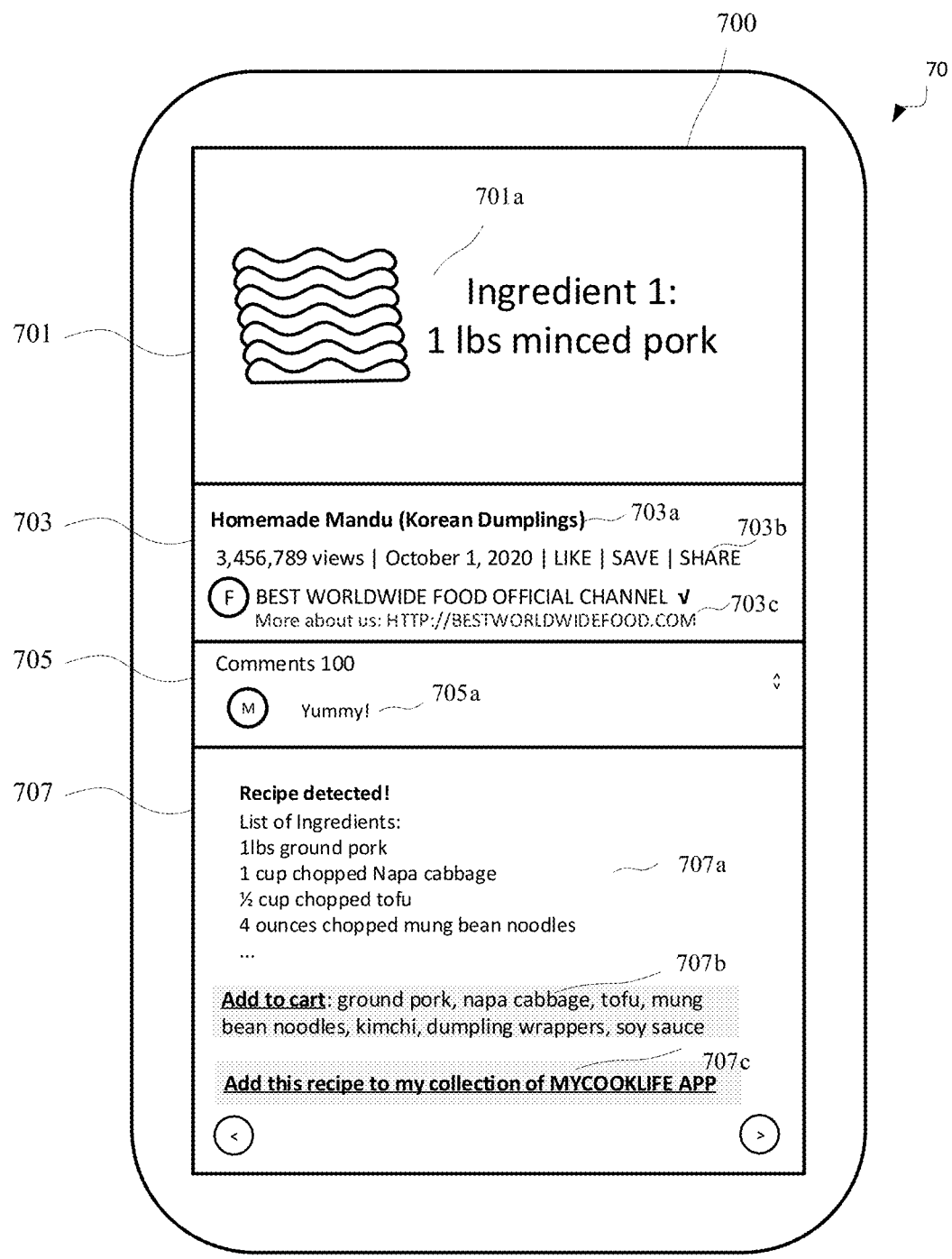

FIGS. 7A and 7B illustrate an example in which an actionable suggestion is provided for media content that is classified into a second category (e.g., recipe category), for user interaction, in accordance with various implementations. As shown in FIG. 7A, a user of a client device 70 may use a content-access application to watch a video with a title 703a, i.e., homemade Mandu (Korean Dumplings). The video content 701a of the video can be displayed in a video-displaying region 701 of an user interface 700 of the client device 70. Metadata associated with the video can include the title 703a, a video summary information 703b, a channel section 703c for a channel F that uploads or shares the video. Optionally, comments (e.g., comment 705a from user M saying "Yummy!") to the video can be displayed at a comment region 703 of the user interface 700 of the client device 70, and similar videos (e.g., 707a and 707b) recommended for the user can be displayed at a recommendation region 707 of the user interface 700 of the client device 70. Based on the metadata and/or the video content 701a, the video can be classified into a recipe category.

Further, referring to FIG. 7B, after the user has watched the video for a minimum required period (e.g., 10 seconds), a recipe extracted from the video content 701a can be displayed at the recommendation region 707, along with one or more actionable suggestions (e.g., suggestion 707b and suggestion 707c). The suggestion 707b can suggest a first action of adding the list of ingredients (ground pork, Napa cabbage, tofu, mung bean noodles, kimchi, dumpling wrappers, soy sauce) to a shopping cart of a first third-party application (e.g., a grocery delivery app). The suggestion 707b can suggest a second action of adding this recipe to a second third-party application with which the user creates collections of recipes (and/or shares food prepared using those recipes). As a non-limiting example, the first action and the second action can be determined based on the video being classified into the recipe category and/or based on whether the user has a registered account of the third-party applications that are to perform the first and second actions respectively.

Figure 8:
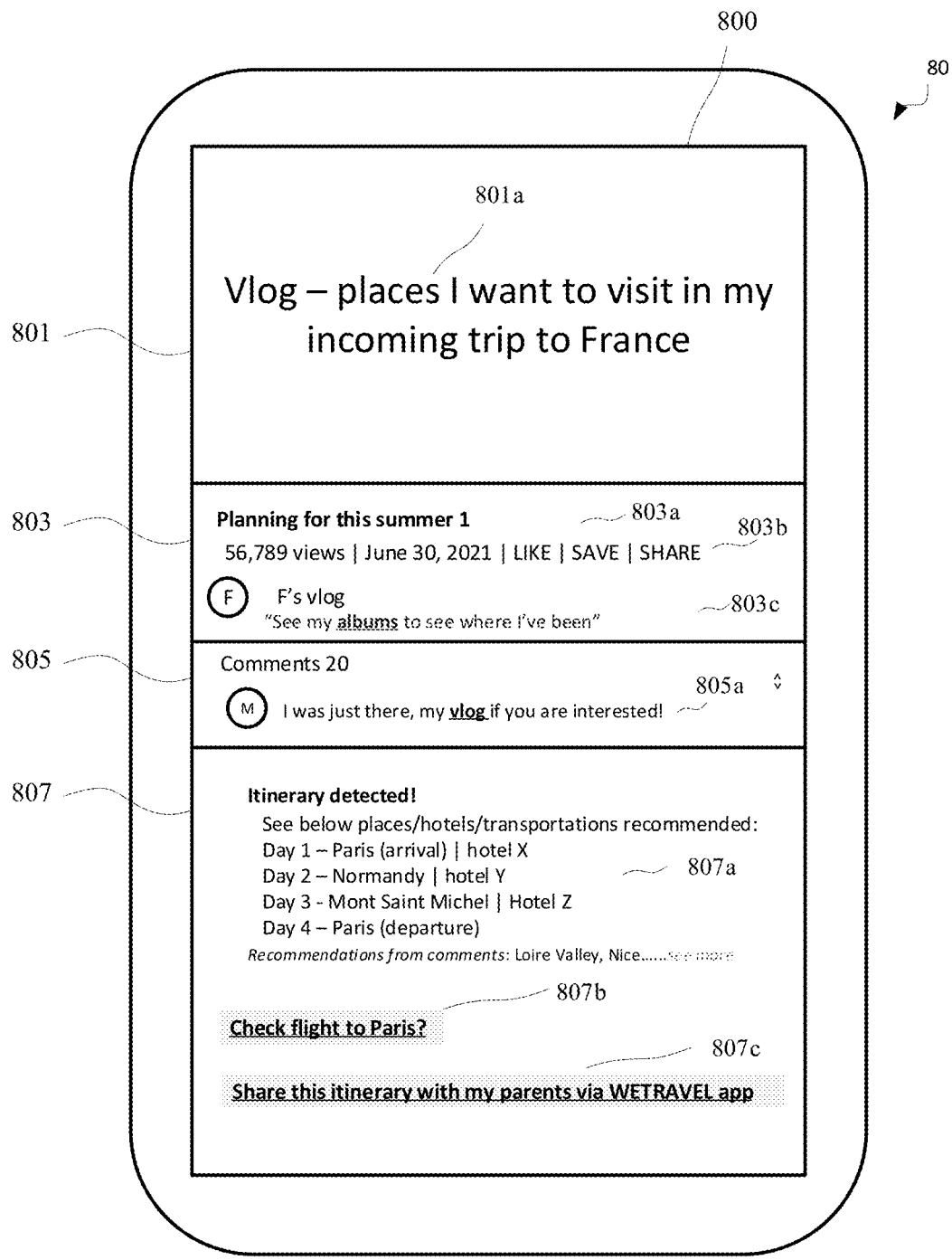
FIG. 8 illustrates an example in which an actionable suggestion is provided for media content that is classified into a third category, for user interaction, in accordance with various implementations.

FIG. 8 illustrates an example in which an actionable suggestion is provided for media content that is classified into a third category (e.g., travel category), for user interaction, in accordance with various implementations. As shown in FIG. 8, a user of a client device 80 may use a content-access application to watch a vlog with a title 803a, i.e., Planning for this summer. The video content 801a of the video can be displayed in a video-displaying region 801 of an user interface 800 of the client device 80. Metadata associated with the video can include the title 803*a*, a video summary information 803*b*, a channel section 803*c* for a channel F that uploads or shares the video. Optionally, comments (e.g., comment 805*a* from user M saying "I was just there, my vlog if you are interested!") to the video can be displayed at a comment region 803 of the user interface 800 of the client device 80, and one or more suggestions can be displayed at a suggestion region 807 of the user interface 800 of the client device 80.

In this example, based on processing the video content 801*a*, the video can be classified into a travel category, and target content can be extracted from the video content 801*a*, where the target content (i.e., an itinerary 807*a* showing places to visit and hotels to stay for each day) is tailored to the travel category. Optionally, the target content, i.e., the itinerary 807*a* can be displayed within the suggestion region 807. The target content can be applied to determine one or more actions, where the one or more action can include, for example, checking flight to Paris, and sharing the itinerary with a friend or family member. Based on the one or more actions and corresponding applications to perform the one or more actions, one or more suggestions can be generated and displayed. As shown in FIG. 8, the one or more suggestions can include a first suggestion 807*b* that suggests the first action, i.e., "checking flight to Paris". Alternatively or additionally, the one or more suggestions can include a second suggestion 807*c* that suggests the second action, i.e., "share this itinerary with my parents via WETRAVEL app". Once the user selects the first suggestion 807*b* (or the second suggestion 807*c*), the first action (or the second action) can be correspondingly performed, without the user having to leave or close the user interface 800 of the client device 80.

Figure 6:
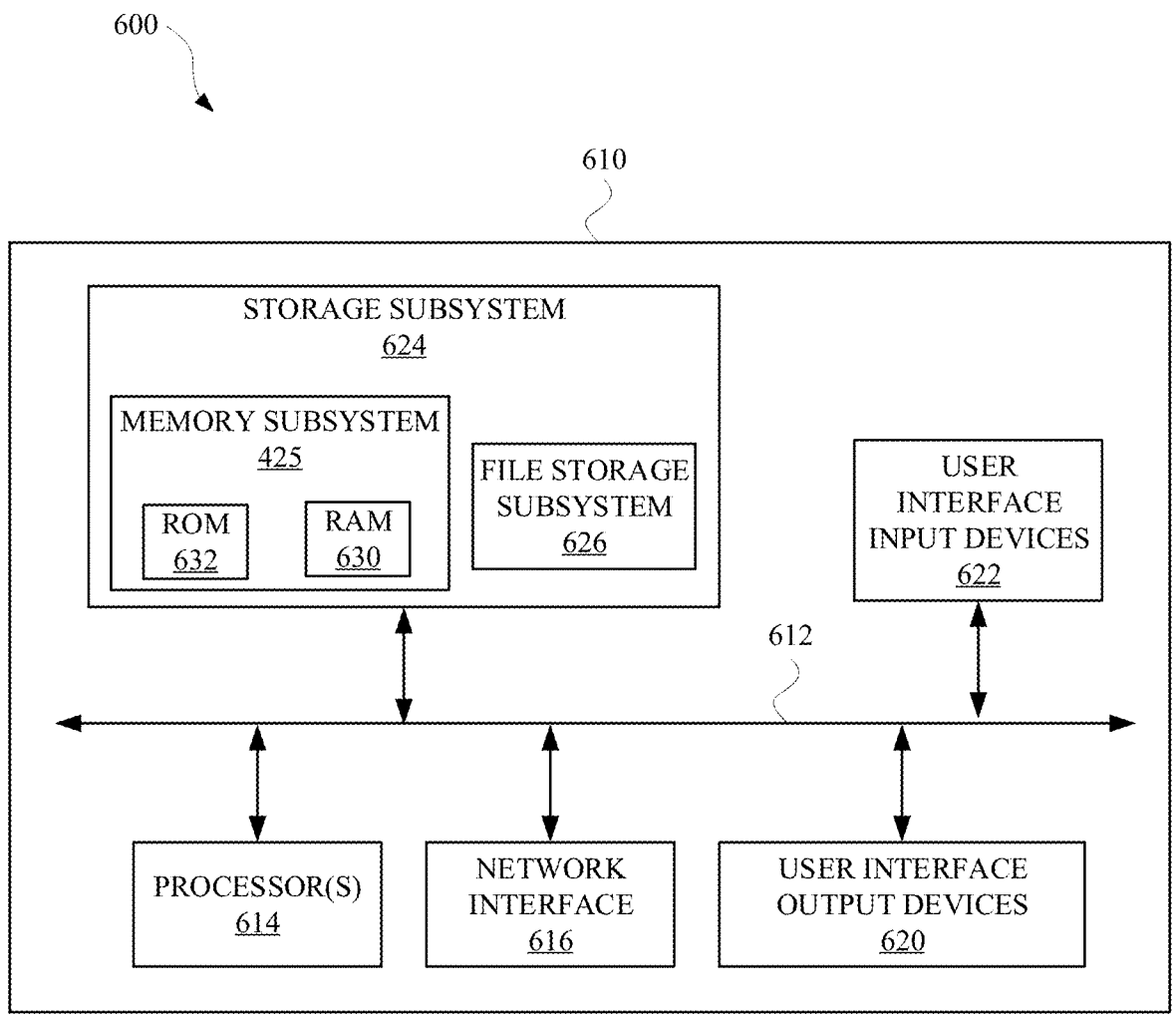
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, a cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Figure 9:
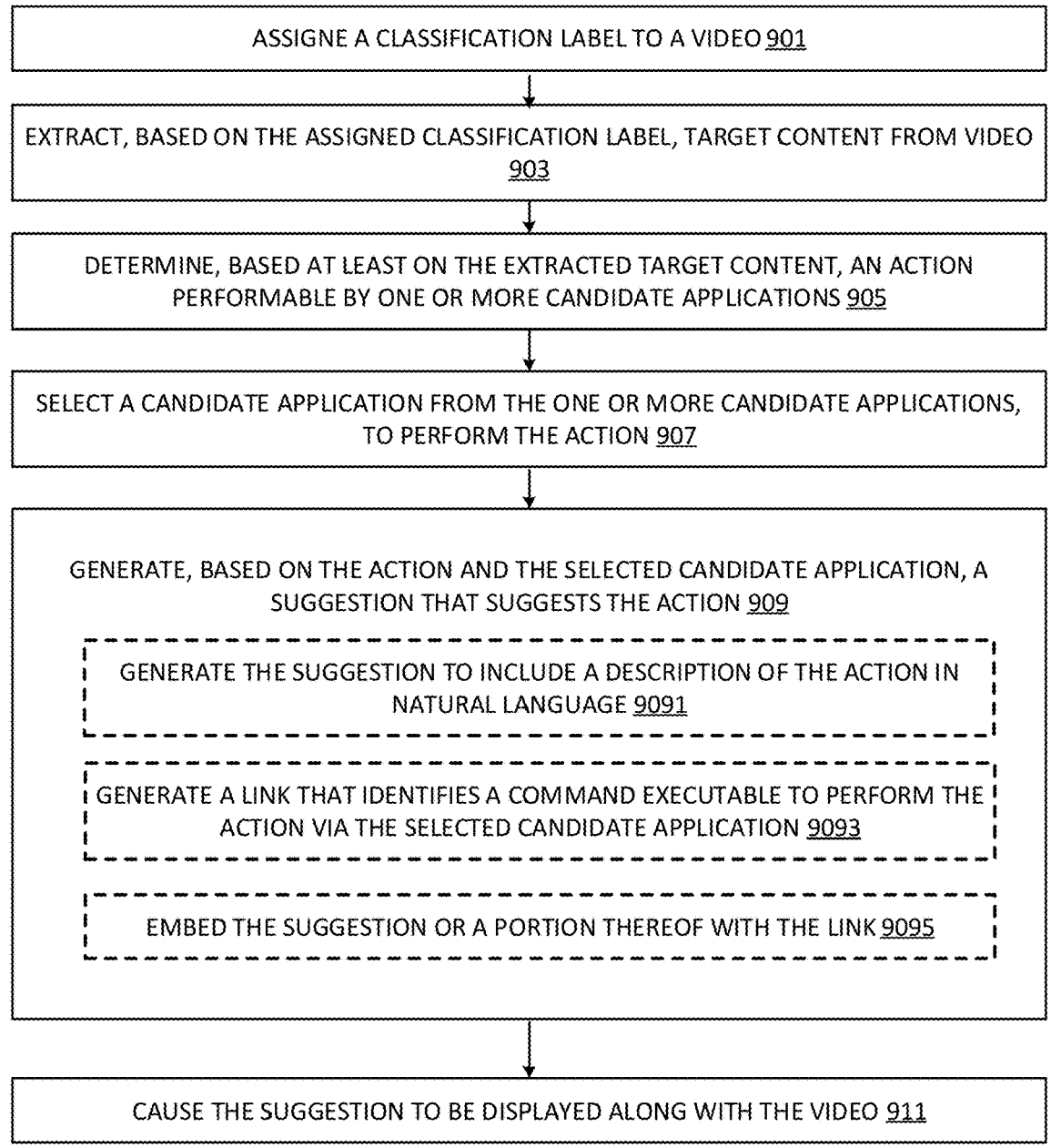
FIG. 9 is a flowchart illustrating an example method of displaying an actionable suggestion for a video, in accordance with various implementations.

In various implementations, referring to FIG. 9, a method 900 of displaying an actionable suggestion for media content is provided, where operations of the method 900 are described with reference to a system that performs the operations. The system of method 900 includes one or more processors and/or other component(s) of a client device and/or of a server device. Moreover, while operations of the method 900 are shown in a particular order, this is not meant to be limiting. One or more operations may be reordered, omitted, or added. At block 901, the system can assign a classification label to a video. These and other implementations of the technology disclosed herein can optionally include one or more of the following features. In some implementations, the label can be assigned by a creator of the video. In some implementations, the classification label can be assigned by one or more viewers of the video. In some implementations, the classification label can be assigned based on processing metadata associated with the video. Here, the metadata can include a title of the video created by the creator of the video, a video description of the video created by the creator of the video, video captions manually created for the video (which can be different from a transcription of the video obtained via speech recognition and may or may not displayed to a viewer of the video), and other applicable data for the video.

In some implementations, the classification label can be assigned based on processing the video itself. For example, the classification label can be assigned based on processing a transcription of the video and/or video frames of the video, where the transcription of the video can be obtained via speech recognition of the video. In some implementations, the classification label can be assigned based on processing the video and the metadata. The classification label can be, for example, a recipe label, a music label, a movie label, a trip label, a test-preparation label, a shopping haul label, an experience-sharing label, a story label, a biography label, a room-tour video, a dog-training label, a concert label, etc., and the present disclosure is not limited thereto.

In various implementations, at block 903, the system can extract target content from the video based on the assigned classification label. In some implementations, for different classification labels, different content extraction parameters can be identified, and different categories of target content can be extracted from the video based on content extraction parameters correspondingly identified for a respective category. As a non-limiting example, given a recipe label, a list of ingredients and/or information that is associated with the list of ingredients (name, quantity, ingredient description, etc.) can be extracted from the video as the target content using ingredient extraction parameter(s) for the recipe label. As another non-limiting example, given a concert label, a list of songs (and/or information associated with the list of songs, such as titles of the songs, performer(s) of the songs, whether it's live or recorded versions, etc.) can be extracted from the video as the target content based on concert extraction parameters predefined for the concert label. As a further non-limiting example, given a tourism label, a list of destinations (and/or information associated with the list of destinations) can be extracted from the video as the target content based on tourism extraction parameters assigned to the tourism label, where the information associated with the list of destinations can include but is not limited to: hotel information, transportation information (flight, train, bus, etc.), restaurant information, ticket information, tour information, review information, celebrity information, etc. As an additional non-limiting example, given a home-improvement label, a list of tools/materials and associated information (e.g., color, manufacturer, quantity, etc.) can be extracted from the video as the target content based on home-improvement extraction parameter for the home-improvement label.

In various implementations, at block 905, the system can determine, based at least on the extracted target content, an action fulfillable by one or more candidate applications. The one or more candidate applications can include one or more third-party applications and an automated assistant (may also be referred to as "a first-party application").

As a non-limiting example, when a list of ingredients (and/or information associated with the list of ingredients) are extracted from the video as the target content, adding the list of ingredients to a shopping cart can be determined as the action, where such action can be performed (or ultimately fulfilled/completed) by one or more candidate applications. Alternatively or additionally, given a list of ingredients (and/or information associated with the list of ingredients) being extracted as the target content, adding the list of ingredients and information associated with the list of ingredients to an electronic note can be determined as the action, and the action can be performed by a local note-taking application or a web-based note-taking application. Alternatively or additionally, given a list of ingredients (and/or information associated with the list of ingredients) being extracted as the target content, setting a reminder to shop the list of ingredients can be determined as the action. The examples here, however, are not intended to be limiting.

As another non-limiting example, given a list of songs (with or without singer information) extracted as the target content, ordering ticket(s) for a concert that will play one or more of the songs can be determined as the action, to be fulfilled by a third-party application (e.g., a ticket application named "TICKETAPP"). For such action (ordering concert ticket), one or more intermediate actions may need to be performed. For example, an intermediate action, i.e., searching the Internet for concert that will play one of the songs in the list ("target content") extracted from the video, may be performed via the automated assistant. In this example, the automated assistant may search and identify that a local band is going to play song B, one of the songs extracted from the video, during a performance at Jazz Hall this Sunday, where tickets are currently on sale via a third-party application (i.e., the ticket application "TICKETAPP"). Correspondingly, adding one or more tickets for the performance to a shopping cart of the ticket application "TICKETAPP" can be determined at the action to be recommended to the user, which is fulfillable via the ticket application "TICKETAPP".

In various implementations, optionally, at block 907, the system can determine (or select) a candidate application from the one or more candidate applications to perform (or to fulfill) the action. Optionally, the candidate application can be determined based on its user historical data (e.g., the frequency of the candidate application being used by a current user or other users, within the past week or past month). Optionally, the candidate application can be determined based on a matching between the action and a function of the candidate application. Optionally, ranking scores can be generated for the one or more candidate applications, and the candidate application having the highest ranking score can be selected as the candidate application to perform the action. The ranking scores here can be generated based on the user historical data, the matching between the action and function(s) of the candidate applications, etc.

In various implementations, at block 909, the system can generate, based on the selected candidate application, a suggestion that suggests the action. As a non-limiting example, the suggestion can include a textual portion describing the action in natural language. Optionally, the suggestion can further include one or more icons or emojis, where the icons or emojis may or may not indicate a type of the action (or represents the candidate application that ultimately fulfills the action).

Optionally, in some implementations, the system can generate the suggestion that suggests the action (909) by: at block 9091, generating the suggestion to include a description of the action in natural language (the aforementioned "textual portion"), for read by user(s) of a content-sharing application (may also referred to as "content-accessing application") that delivers the video. For example, referring to FIG. 2A, the suggestion 208 can include a textual portion describing the action (i.e., "add concert ticket") in natural language (i.e., "Taylor to sing Song A at Fantasy Concert this May, add ticket?").

Optionally, the system can generate the suggestion that suggests the action (909) by: at block 9093, generating a link that identifies a command to perform the action to which the selected candidate application corresponds. As a non-limiting example, the link can be a URL that causes one or more tickets for Taylor's Fantasy Concert to be added to a shopping cart of a ticket application such as "TICKETAPP" (or to a shopping cart of a ticket website such as "www.the-best-concert-ticket.com"). Optionally, the system can generate the suggestion that suggests the action (909) by: at block 9095, embedding the suggestion (or a portion thereof) with the link.

In various implementations, at block 911, the system can cause the suggestion to be displayed along with the video. For example, the suggestion can be displayed as a selectable element at a user interface of a content-sharing application that displays the video. A user of the content-sharing application, after reading the suggestion that suggests the action with which the selected candidate application is associated, can select the selectable element at which the suggestion is displayed, to execute the link embedded in the suggestion, where the execution of the link fulfills the action (e.g., adding concert tickets to a shopping cart of the ticket application "TICKETAPP"). In some implementations, the execution of the link is realized in the background, without the ticket application being opened, so that the user does not need to close or stop watching the video.

In some implementations, continuing with the above example, after the action is performed, a confirmation message (e.g., "tickets add to cart successfully" or "tickets add to cart successfully, check out?") can be displayed as a pop-up window with respect to the video, for possible further user interaction. Optionally, the confirmation message can disappear after being displayed for a certain period of time (e.g., 10 s), and after the confirmation message disappears, a selectable button embedded with a link to check out the cart of the ticket application "TICKETAPP" can be displayed at the user interface of the content-sharing application, for further user interaction if the user subsequently decides to check out the ticket(s) that are added to the cart, without interrupting the user's experience in watching the video. Optionally, the selectable button embedded with a link to check out the cart can be minimized but configured with an attention-attracting appearance to remind the user of its existence.

Figure 10:
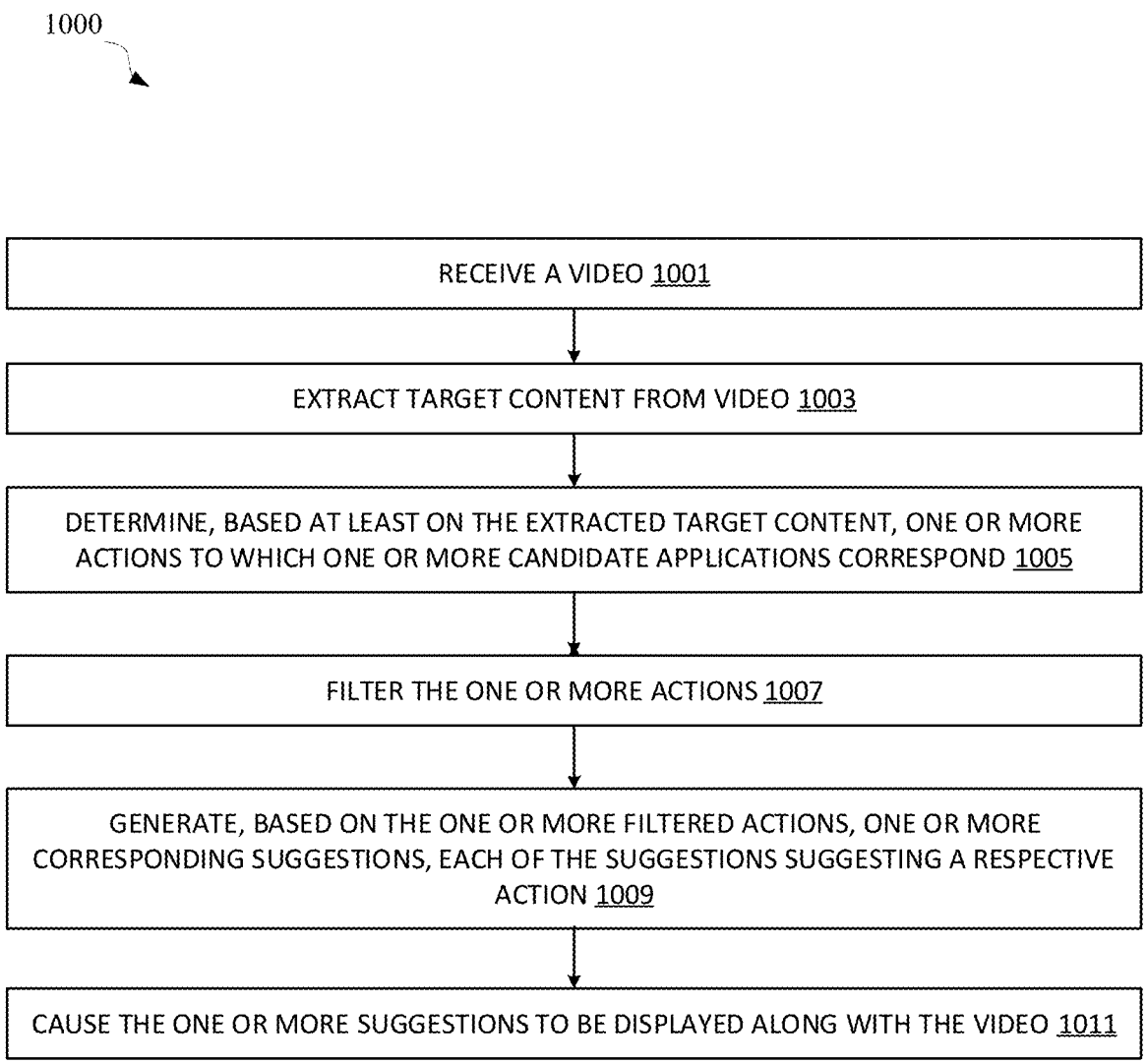
FIG. 10 is another flowchart illustrating an example method of displaying an actionable suggestion for a video, in accordance with various implementations.

In various implementations, referring to FIG. 10, a method 1000 of displaying an actionable suggestion for media content is provided, where operations of the method 900 are described with reference to a system that performs the operations. The system of method 900 includes one or more processors and/or other component(s) of a client device and/or of a server device. Moreover, while operations of the method 900 are shown in a particular order, this is not meant to be limiting. One or more operations may be reordered, omitted, or added. In various implementations, at block 1001, the system receives a video. Optionally, instead of a video, animated slides, audio (e.g., music), or a combination thereof can be received. Optionally, after receiving the video, whether the video includes a classification label can be determined. If no classification label is detected or retrieved, the video and/or metadata associated with the video can be processed to determine a classification label for the video.

In various implementations, at block 1003, the system extracts target content from the video. Optionally, a type (or category) of the target content to be extracted from the video can be determined or predefined based on the classification label for the video. For example, for a video with a classification label (i.e., a recipe label), the category of the target content to be extracted from the video can be predefined as "ingredient", and a list of ingredients can be extracted from the video as the target content.

In various implementations, at block 1005, the system determines, based at least on the extracted target content, one or more actions to which one or more candidate applications correspond. For example, for a list of ingredients extracted from the video, a first action of adding the list of ingredients to today's note in a first candidate application (e.g., a note-taking app) can be determined, and/or a second action of adding the list of ingredients to a shopping cart of a second third-party application (e.g., a shopping app) can be determined. Optionally, a third action or more actions in addition to the first, second, and third actions can be determined, and the present disclosure is not limited thereto.

In various implementations, optionally, at block 1007, the system filters the one or more actions. For example, the aforementioned first action, or the first and second actions, can be filtered out of a plurality of actions that include the first, second, third, and fourth actions.

In various implementations, at block 1009, the system generates, based on the filtered one or more actions, one or more corresponding suggestions each suggest a respective action, of the filtered one or more actions. As a non-limiting example, one or more corresponding suggestions can include a first suggestion and a second suggestion. The first suggestion can be, for example, "add to note the following ingredient to make Mandu (Korean dumplings): pork, cabbage, tofu, dumpling wrappers", which is generated based on the first action of adding a list of ingredients (pork, cabbage, tofu, dumpling wrappers) to today's note in the first candidate application (e.g., the note-taking app). The second suggest can be, for example, "add to cart: pork, cabbage, tofu, dumpling wrappers", which is generated based on the second action of adding a list of ingredients (pork, cabbage, tofu, dumpling wrappers) to a shopping cart of the second third-party application (e.g., the shopping app).

In various implementations, at block 1011, the system causes the one or more corresponding suggestions to be rendered at a display at which the video is displayed. As described above, the one or more corresponding suggestions can be respectively displayed in one or more selectable elements and can be respectively embedded with corresponding links, which when executed, can cause a corresponding action of the filtered one or more actions to be performed. For example, when a user selects the first suggestion, a link embedded in the first suggestion can be executed so that the first action can be performed. For example, when the user selects the first suggestion, a note containing extracted target content and/or other information, such as "ingredient to make Mandu (Korean dumplings): pork, cabbage, tofu, dumpling wrappers" or "06-06-2021 note: ingredient to make Mandu (Korean dumplings): pork, cabbage, tofu, dumpling wrappers. Source: xxx" can be created in the note-taking application, without requiring the user to leave the video they are currently viewing to open the note-taking application for a series of manual inputs or switching operations between the content-sharing application that provides the video and the note-taking applications. In some implementations, the suggestion is pre-generated and is indexed, in an index, based on the document information, and identifying the suggestion comprises using the document information to identify the pre-generated suggestion in the index. In these implementations, the document information can comprise a resource identifier of the document. In these implementations, the resource identifier can be a uniform resource locator of the document.

In some implementations, a method implemented by one or more processors is provided, and includes: receiving media content. The media content can be received or retrieved using an address of the media content, or can be received directly. The media content can be a video, audio, auto-play slides, or any other applicable content. In some implementations, the method further includes: processing the media content and/or metadata associated with the media content, to classify the media content into a first category, of a plurality of predefined categories. For example, the media content can be processed to classify the media content into the first category (sometimes also referred to as "first predefined category") of the plurality of predefined categories. Alternatively, the metadata associated with the media content can be processed to classify the media content into the first category. Alternatively, both the media content and the metadata associated with the media content are processed to classify the media content into the first category.

In some implementations, the method further includes: extracting target content from the media content, where the target content is extracted based on the first category and is extracted based on the first category in response to the media content being classified into the first category. In some implementations, the method further includes: generating, based on the extracted target content, an action that corresponds to an application that is separate from an alternate application via which the media content is rendered. The alternate application can be the aforementioned content-access application, such as a social media platform, and the present disclosure is not limited thereto. In some implementations, the method further includes: generating, based on the generated action and the application to which the generated action corresponds, a selectable suggestion, where the selectable suggestion includes a textual portion that describes the generated action.

In some implementations, the method further includes: causing the selectable suggestion to be displayed at a display of a client device, along with rendering of the media content at the alternate application. As a non-limiting example, the selectable suggestion can be displayed when the media content is rendered at the alternate application (e.g., the social media application), where the selectable suggestion is displayed an overlay of the media content. In some implementations, the selectable suggestion, when selected, causes the application to perform the action. For example, the application can cause one or more items to be added to a shopping cart of a shopping app. In some other implementations, the selectable suggestion, when selected, causes an automated assistant (that is in communication with the application) to perform the action, where the action relates to a service or function of the application. For example, the automated assistant can cause one or more items to be added to a shopping cart of a shopping app.

These and other implementations of technology disclosed herein can optionally include one or more of the following features.

In some implementations, the media content includes a plurality of video frames or image frames, and processing the media content to classify the media content into the first category includes: detecting one or more target objects from the plurality of video frames or image frames; and classifying the media content based on the one or more detected target objects.

In some implementations, the media content includes an audio portion, and processing the media content to classify the media content into the first category includes: generating a transcription of the audio portion; detecting one or more keywords from the transcription of the audio portion; and classifying the media content based on the one or more detected keywords.

In some implementations, processing the media content and/or metadata associated with the media content, to classify the media content into the first category includes: processing the media content and/or the metadata associated with the media content, using a machine learning model to generate output; and classifying the media content into the first category based on the output. As a non-limiting example, the output generated by the ML model can include a plurality of probabilities, where each of the probabilities can indicate how likely the media content belongs to a respective predefined category of the one or more predefined categories. In this example, the media content can be classified into the first category based on a first probability that indicates how likely the media content belongs to the first category satisfies a threshold, while all other probabilities, of the plurality of probabilities, fail to satisfy the threshold).

In some implementations, processing the media content and/or metadata associated with the media content, to classify the media content into the first category includes: determining whether the metadata associated with the media content includes any classification label from a plurality of predefined classification labels. In response to determining that the metadata associated with the media content includes the classification label, the method can further include: bypassing processing of the media content, and classifying the media content into the first category based on the classification label included in the metadata associated with the media content.

In some implementations, the metadata associated with the media content includes a title of the media content, a manual description of the media content, one or more manual captions of the media content, and/or comment to the media content retrieved from a content-sharing application that is displaying the media content at the display.

In some implementations, extracting, based on the first category, the target content from the media content, comprises: identifying content extraction parameters based on the content extraction parameters being assigned to the first category, where the content extraction parameters lack any assignment to one or more additional category of the predefined categories; and using the content extraction parameters in extracting the target content from the media content in response to the content extraction parameters being assigned to the first category and the media content being classified into the first category. In some implementations, the content extraction parameters are assigned to only the first category and lack any assignment to any other of the predefined categories.

In some implementations, the selectable suggestion is embedded with a link and when the selectable suggestion is selected, the link is executed to cause the action to be performed.

In some implementations, during performance of the action by the application, the media content can continue to be rendered, uninterrupted, at the display. Alternatively, during performance of the action by the application, the media content can be paused at the display.

In some implementations, the method further includes: selecting the application from a plurality of candidate applications, where selecting the application includes: generating a corresponding ranking score for each of applications; ranking, based on the generated corresponding ranking scores, the applications; and selecting the application based on the ranking.

In some implementations, generating the corresponding ranking scores includes: generating each of the corresponding ranking scores based on (1) historical data, for an active user of the client device, for a corresponding one of the applications; and/or (2) whether the active user has a registered account for the corresponding one of the applications.

In some implementations, the method further includes: receiving a selection of the suggestion, and in response to receiving the selection of the suggestion: causing the action to be performed by the application. In some implementations, the method further includes: causing an additional suggestion to be rendered, along with the media content, at the display to replace the suggestion, wherein the additional suggestion includes a textual portion that suggests an additional action to be performed via the application.

In some implementations, the method further includes: receiving a selection of the additional suggestion; and in response to receiving the selection of the suggestion, causing a user interface of the application to be rendered as an overlay with respect to the media content, where the user interacts with the user interface of the application to perform the additional action.

In some implementations, receiving media content includes: receiving an address of the media content; and parsing the address of the media content to retrieve the media content and/or the metadata associated with the media content.

In some implementations, the suggestion is displayed at the display when the target content, of the media content, is rendered.

In some implementations, the suggestion is displayed at the display when a predetermined period of time has passed since the media content is displayed.

In some implementations, the suggestion is displayed for a predefined period of time, and automatically disappears after being displayed for the predefined period of time.

In some implementations, a method implemented by one or more processors is provided, and includes: extracting, in dependence on a determined classification for media content, target content from the media content; determining, based on the extracted target content, a plurality of candidate actions that each utilize the extracted target content; selecting a subset of the candidate actions, including a first action that causes the first application to perform a first function based on the extracted target content and a second action that causes a second application to perform a second function based on the extracted target content; generating, based on the selected subset of candidate actions, a plurality of selectable suggestions, including a first selectable suggestion that, when selected, causes performance of the first action by the first application and a second selectable suggestions that, when selected, causes performance of the second action by the second application; and in response to determining a client device is displaying the media content, causing the plurality of selectable suggestions to be displayed at the client device and along with the media content.

In some implementations, a method implemented by one or more processors is provided, and includes: displaying media content via a content-sharing application at a client device; and displaying a suggestion, along with the media content, via a same interface of the content-sharing application. In these implementations, the suggestion can be generated based on target content extracted from the media content. The suggestion can include a textual portion describing an action to which an application corresponds. The suggestion can be embedded with a link that, when executed, causes the action to be performed via the application. The suggestion can be displayed in a selectable element that, when selected, executes the link.

In some implementations, a method implemented by one or more processors is provided, and includes: identifying media content. Here, as a non-limiting example, the media content can be a video, or a webpage including a video and a short description of the video. As another non-limiting example, the media content can be an audio book, or music. The media content can be rendered visually or audibly via a content-access application such as a web browser or a media player. The method can further include: performing natural language processing, on a transcription of the media content, to annotate each of a plurality of phrases of the transcription with a corresponding entity tag (or "entity category", or "category"). As a non-limiting example, when the media content is a webpage including a video and a short description of the video, the transcription of the media content can include: a transcription of the video obtained from speech recognition of the video, and the short description of the video. In this example, natural language processing can be performed on the transcription of the media content to annotate a plurality of phrases or words (e.g., Bourbon pudding, two eggs, 3 cups of milk, 8 slices of French bread, and 1 teaspoon Bourbon) throughout the transcription with a plurality of corresponding entity tags (e.g., "prepared food", "ingredient quantity" "ingredient name", etc.). In other words, the transcription of the media content can be processed to annotate a first phrase or word (i.e., "Bourbon pudding") with a first entity tag (i.e., "dish"), annotate a second phrase or word (i.e., "two") with a second entity tag (i.e., "ingredient quantity") based on the word "two" being in the phrase "two eggs", annotate a third phrase or word (i.e., "eggs") with a third entity tag (i.e., "ingredient name"), annotate a fourth phrase or word (i.e., "3 cups") with the second entity tag (i.e., "ingredient quantity"), annotate a fifth phrase or word (i.e., "milk") with the third entity tag (i.e., "ingredient name"), annotate a sixth phrase or word (i.e., "8 slices") with the second entity tag (i.e., "ingredient quantity"), annotate a seventh phrase or word (i.e., "French bread") with the third entity tag (i.e., "ingredient name"), annotate an eighth phrase or word (i.e., "1 teaspoon") with the second entity tag (i.e., "ingredient quantity"), and annotate a ninth phrase or word (i.e., "Bourbon") with the third entity tag (i.e., "ingredient name").

The aforementioned method can further include: determining that a sequence of phrases, of the transcription, correspond to an action, where determining that the sequence of phrases correspond to the action comprises: determining that the corresponding entity categories of the sequence of phrases correspond to the action. For instance, the action can be determined based on the corresponding entity categories (or entity tags) of the sequence of phrases and/or based on an association between the corresponding entity categories (or entity tags). Given a sequence of phrases or words (i.e., Bourbon pudding, two eggs, 3 cups of milk, 8 slices of French bread, and 1 teaspoon Bourbon, or alternatively "Bourbon pudding is prepared using two eggs, 3 cups of milk, 8 slices of French bread, and 1 teaspoon Bourbon") with their correspondingly annotated entity categories ("dish", "ingredient quantity" "ingredient name", and/or "cook" annotated for the phrase "prepared") and sometimes the association between the annotated entity categories (e.g., an association between "ingredient quantity" and "ingredient name", an association between "dish" and "ingredient name", and/or an association between "cook" and "dish"), the action to which the sequence of phrases correspond can be determined as an action of adding ingredients (e.g., eggs, milk, French bread, and Bourbon) mentioned in the media content to an electronic shopping cart.

Alternatively, the action to which the sequence of phrases correspond can be determined as an action of saving the ingredients (e.g., eggs, milk, French bread, and Bourbon) mentioned in the media content in an electronic note. Depending on user activity/historical data (e.g., a user often uses a digital photo book to save an image/screenshot of a movie scene with the movie name after watching official movie trailers using a social media application), application data (e.g., digital photo book app is installed or accessible via the client device, while an electronic note-taking application is not accessible via the client device), and/or other applicable data, the action to which the sequence of phrases correspond can be determined as other actions (e.g., saving a screenshot of video showing the name of a movie). The examples of the action to which the sequence of phrases correspond here are for purpose of illustration only, and are not intended to be limiting.

Optionally, the action (e.g., adding ingredients to an electronic shopping cart) can be performed an application, or is performable by more than one application (in this latter case, a particular application may be selected from the more than one application to perform the action). Such action can be performed by opening an application to run in the foreground to receive additional user input (e.g., remove an added ingredient from the shopping cart, change a quantity of an added ingredient, or search and add an additional ingredient to the shopping cart, etc.). Alternatively, the action can be performed by the application running in the background, without having the application opened and running in the foreground, so that the user's experience in browsing the media content will not be interrupted and that computing resources can be saved.

The aforementioned method can further include: in response to determining that the sequence of phrases correspond to the action: generating, based on the sequence of phrases, an application action that includes content (e.g., an embedded URL having one or more parameters, such as the name of the ingredients and/or quantities of the ingredients) determined based on the sequence of phrases, where the generation of the application action can cause performance of the action by an application (that is separate from the aforementioned content-access application). In other words, while the action does not necessarily identify an application capable of performing the action, the application action specifies the application to perform the action. For example, based on phrases or words (i.e., Bourbon pudding, two eggs, 3 cups of milk, 8 slices of French bread, and 1 teaspoon Bourbon) that correspond to an action of "saving a recipe electronically", an application action of "saving a recipe in an electronic note of the note-taking application A" can be determined.

Optionally, the content for the application action can be, or can include, one or more parameters for the application action, where the one or more parameters can be used to cause performance of the action by the application. For instance, the content for the application action can include a link (e.g., URL) or a command having the one or more parameters. In this case, generating the application action that includes content determined based on the sequence of phrases can be generating an executable link or command, which when executed, causes the performance of the action by the application using the one or more parameters.

The one or more parameters can, for example, include: (a) a name or an identifier of the application to perform the action, and (b) one or more objects (e.g., half dozen eggs) determined based on (i.e., does not necessarily need to be the same as) the phrases or words (e.g., two eggs) extracted from the transcription of the media content (e.g., a cooking video). As a non-limiting example, the one or more parameters can include ingredient names and/or their associated quantities (e.g., "two eggs", "3 cups of milk", "8 slices of French bread", and "1 teaspoon Bourbon") mentioned exactly in a cooking recipe, and the name of the application (e.g., "note-taking app A") to perform the action (e.g., save the ingredient names and/or their associated quantities in an electronically).

As another non-limiting example, when the action is to add ingredients to a shopping cart and grocery app A is determined or selected to perform the action, the application action can be "adding ingredients to a shopping cart of the grocery app A". In this case, the one or more parameters for the application action can include names of grocery items for the ingredients and quantities (the quantities here can be modified quantity, such as "8 oz of Bourbon", instead of the original quantities required by the recipe, such as "1 teaspoon of Bourbon", where the modified quantity can be determined based on the package size available for the grocery items, which shall be greater than or equal to the original quantities mentioned in the recipe) of the grocery items available to order to perform the action of cooking.

In the above example, the application action can be adding "half dozen eggs, half gallon milk, 1 pound French bread, and 4 oz teaspoon Bourbon" to a shopping cart of web-based grocery app A (or alternatively, adding "half dozen eggs, half gallon milk, 1 pound French bread, and 4 oz teaspoon Bourbon" to a shopping cart of the grocery app A), while the media content mentions "two eggs", "3 cups of milk", "8 slices of French bread", and "1 teaspoon Bourbon" as ingredients of a recipe. It's noted that the application action can optionally be performed by an automated assistant in communication with the application. For instance, instead of sending the one or more parameters to the grocery app A to add ingredients to the shopping cart of the grocery app A, the one or more parameters can be sent, according to the embedded link, to the automated assistant, for the automated assistant to add the ingredients to the shopping cart of the grocery app A.

The aforementioned method can further include: generating, based on the generated application action, a selectable suggestion including a textual portion that describes the application action; and in response to rendering of the media content at an alternate application at a client device, causing the selectable suggestion to be displayed at a display of the client device, along with the rendering of the media content at the alternate application, wherein the selectable suggestion, when selected, causes the application to perform the application action. Here, the alternate application can be a content-access application, such as a web browser, a social media application, or any other applicable application. Descriptions of the selectable suggestion and descriptions with respect to the rendering of the selectable suggestion can be found in other portions of this disclosure and are not repeated herein.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented using one or more processors, the method comprising:
    receiving media content rendered or to be rendered via a first application;
    processing the media content or metadata associated with the media content, to classify the media content into a first category, of a plurality of predefined categories;
    extracting target content from the media content, wherein the target content is extracted from the media content based on the first category and is extracted based on the first category in response to the media content being classified into the first category;
    determining, based on the extracted target content, a first action to be executed via a second application that is separate from the first application, wherein the first application and the second application are installed at a client device;
    generating, based on the determined first action to be executed via the second application, a first selectable graphical element that is embedded with an identifier of the second application and that displays a textual portion describing the first action to be executed via the second application;
    configuring the first selectable graphical element to be displayed at a user interface of the first application via a display of the client device, along with the media content at the user interface of the first application;
    receiving, from a user, a selection of the first selectable graphical element that is displayed at the user interface of the first application; and
    in response to receiving the selection of the first selectable graphical element that is displayed at the user interface of the first application configuring the second application to execute the first action that is described in the textual portion of the first selectable graphical element.

2. The method of claim 1, wherein the media content includes a plurality of video frames or image frames, and processing the media content to classify the media content into the first category includes:
    detecting one or more target objects from the plurality of video frames or image frames; and
    classifying the media content based on the one or more detected target objects.

3. The method of claim 1, wherein the media content includes an audio portion, and processing the media content to classify the media content into the first category includes:
    generating a transcription of the audio portion;
    detecting one or more keywords from the transcription of the audio portion; and
    classifying the media content based on the one or more detected keywords.

4. The method of claim 1, wherein processing the media content or metadata associated with the media content, to classify the media content into the first category includes:
    processing the media content or the metadata associated with the media content, using a machine learning model to generate output; and
    classifying the media content into the first category based on the output.

5. The method of claim 1, wherein processing the media content or metadata associated with the media content, to classify the media content into the first category includes:
    determining whether the metadata associated with the media content includes any classification label from a plurality of predefined classification labels, and
    in response to determining that the metadata associated with the media content includes the classification label:
        bypassing processing of the media content, and
        classifying the media content into the first category based on the classification label included in the metadata associated with the media content.

6. The method of claim 1, wherein the metadata associated with the media content includes a title of the media content, a manual description of the media content, one or more manual captions of the media content, or comment to the media content retrieved from a content-sharing application that is displaying the media content.

7. The method of claim 1, wherein extracting, based on the first category, the target content from the media content, comprises:
    identifying content extraction parameters based on the content extraction parameters being assigned to the first category; and
    using the content extraction parameters in extracting the target content from the media content in response to the content extraction parameters being assigned to the first category and the media content being classified into the first category.

8. The method of claim 7, wherein the content extraction parameters are assigned to only the first category and lack any assignment to any other of the predefined categories.

9. The method of claim 1, wherein the first selectable graphical element is embedded with a link including the identifier of the second application, and when the first selectable graphical element is selected, the link is executed to fulfill the first action using the second application.

10. The method of claim 1, wherein during execution of the first action by the second application, the media content continues to be rendered, uninterrupted, via the first application at the display.

11. The method of claim 1, further comprising selecting the second application from a plurality of candidate applications, wherein selecting the second application includes:
- generating a corresponding ranking score for each of the candidate applications;
- ranking, based on the generated corresponding ranking scores, the candidate applications; and
- selecting the second application based on the ranking.

12. The method of claim 11, wherein generating the corresponding ranking scores includes:
- generating each of the corresponding the ranking scores based on: historical data, for an active user of the client device, for a corresponding one of the candidate applications; or whether the active user has a registered account for the corresponding one of the candidate applications.

13. The method of claim 1, further comprising:
- in response to receiving the selection of the first selectable graphical element:
  - configuring a second selectable graphical element to be rendered, along with the media content, at the display to replace the first selectable graphical element, wherein the second selectable graphical element includes a textual portion that describes a second action to be executed via the second application, the second action being different from the first action.

14. The method of claim 13, further comprising:
- receiving a selection of the second selectable graphical element; and
- in response to receiving the selection of the second selectable graphical element configuring a user interface of the second application to be rendered as an overlay with respect to the media content, wherein the user interacts with the user interface of the second application to execute the second action.

15. The method of claim 1, wherein receiving the media content includes:
- receiving an address of the media content; and
- parsing the address of the media content to retrieve the media content or the metadata associated with the media content.

16. The method of claim 1, wherein the first selectable graphical element is displayed at the display when the target content, of the media content, is rendered.

17. The method of claim 1, wherein the first selectable graphical element is displayed at the display when a predetermined period of time has passed since the media content is displayed.

18. The method of claim 1, wherein the first selectable graphical element is displayed for a predefined period of time, and automatically disappears after being displayed for the predefined period of time.

19. A method implemented using one or more processors, the method comprising:
- extracting, in dependence on a determined classification for media content, target content from the media content;
- determining, based on the extracted target content, a plurality of candidate actions;
- selecting a subset of the candidate actions, including a first action to be performed via a first third-party application based on the extracted target content and a second action to be performed via a second third-party application based on the extracted target content;
- generating, based on the selected subset of candidate actions, a plurality of selectable graphical elements, including (1) a first selectable graphical element that is embedded with an identifier of the first third-party application to execute the first action using the first third-party application and (2) a second selectable graphical element that is embedded with an identifier of the second third-party application to execute the second action using the second third-party application, wherein the second third-party application is different and separate from the first third-party application; and
- in response to determining a client device installed with both the first and second third-party applications is displaying the media content:
  - configuring the plurality of selectable graphical elements to be displayed at the client device and along with the media content.

20. A method implemented using one or more processors, the method comprising:
- identifying media content accessible or to be rendered via a first application;
- performing natural language processing, on a transcription of the media content, to annotate each of a plurality of phrases of the transcription with a corresponding category;
- determining that a sequence of phrases, of the transcription, correspond to an action, wherein determining that the sequence of phrases correspond to the action comprises determining that the corresponding categories of the sequence of phrases correspond to the action;
- in response to determining that the sequence of phrases correspond to the action:
  - determining, based on the sequence of phrases and the action, a second application to execute application action that corresponds to the action, the second application being separate from the first application, wherein the first application and the second application are installed at a client device; and
  - generating, based on the determined action and the determined second application, a selectable graphical element embedded with an identifier of the second application and including a textual portion that describes the application action; and
- in response to rendering of the media content at a user interface of the first application at the client device:
  - configuring the selectable graphical element to be displayed at the user interface of the first application via a display of the client device, along with the rendering of the media content at the user interface of the first application, wherein the selectable graphical element, when selected, configures the second application to execute the application action.

* * * * *